United States Patent
Kim et al.

(10) Patent No.: US 11,898,031 B2
(45) Date of Patent: Feb. 13, 2024

(54) BIODEGRADABLE POLYESTER RESIN COMPOSITION AND BIODEGRADABLE POLYESTER MOLDED ARTICLE INCLUDING THE SAME

(71) Applicant: Ecovance Co. Ltd., Gyeonggi-do (KR)

(72) Inventors: Kyung Youn Kim, Gyeonggi-do (KR); Seong Dong Kim, Gyeonggi-do (KR); Hoon Kim, Gyeonggi-do (KR); Jun Su Byeon, Gyeonggi-do (KR); Joo Young Jung, Gyeonggi-do (KR); Ji Yeon Ryu, Gyeonggi-do (KR)

(73) Assignee: Ecovance Co. Ltd., Gyeonggi-do (KR)

( * ) Notice: Subject to any disclaimer, the term of this patent is extended or adjusted under 35 U.S.C. 154(b) by 0 days.

(21) Appl. No.: 18/320,826

(22) Filed: May 19, 2023

(65) Prior Publication Data
US 2023/0374298 A1 Nov. 23, 2023

(30) Foreign Application Priority Data

May 21, 2022 (KR) .......................... 10-2022-0062443
May 21, 2022 (KR) .......................... 10-2022-0062447

(51) Int. Cl.
*C08L 67/02* (2006.01)
*C08J 5/18* (2006.01)

(52) U.S. Cl.
CPC ................. *C08L 67/02* (2013.01); *C08J 5/18* (2013.01); *C08J 2367/02* (2013.01); *C08L 2201/06* (2013.01); *C08L 2203/16* (2013.01)

(58) Field of Classification Search
USPC ................................................ 528/271, 272
See application file for complete search history.

(56) References Cited

U.S. PATENT DOCUMENTS 9,637,589 B2 5/2017 Kang et al.
2018/0237584 A1 8/2018 Faiella et al.

FOREIGN PATENT DOCUMENTS

| JP | 2001088264 A | * | 4/2001 |
| JP | 2018-145221 A | | 9/2018 |
| KR | 10-2000-0016673 A | | 3/2000 |
| KR | 2003-0028444 A | | 4/2003 |
| KR | 10-2014-0031010 A | | 3/2014 |
| KR | 10-2015-0005111 A | | 1/2015 |
| KR | 10-2021-0147332 A | | 12/2021 |
| KR | 10-2021-0147334 A | | 12/2021 |
| KR | 10-2022-0015623 A | | 2/2022 |
| WO | 2020/234293 A1 | | 11/2020 |
| WO | 2020/234294 A1 | | 11/2020 |

OTHER PUBLICATIONS

JP-2001088264-A Machine Translation (Year: 2001).*
Extended European Search Report for the European Patent Application No. 23174265.1 issued by the European Patent Office dated Aug. 3, 2023.
International Search Report for the International Application No. PCT/KR2023/004885 issued by the International Searching Authority Korean Patent Office dated Aug. 7, 2023.

* cited by examiner

*Primary Examiner* — Terressa Boykin
(74) *Attorney, Agent, or Firm* — IP & T GROUP LLP

(57) ABSTRACT

An eco-friendly biodegradable polyester resin composition includes: a polyester resin including a diol, an aromatic dicarboxylic acid and an aliphatic dicarboxylic acid; and 5000 ppm to 20000 ppm of a hydrophilic regulator having a molecular weight of 400 to 1300.

19 Claims, 2 Drawing Sheets

BIODEGRADABLE POLYESTER RESIN COMPOSITION AND BIODEGRADABLE POLYESTER MOLDED ARTICLE INCLUDING THE SAME

CROSS-REFERENCE TO RELATED APPLICATION

This application claims priority to and the benefit of Korean Patent Application Nos. 10-2022-0062443, filed on May 21, 2022, and 10-2022-0062447, filed on May 21, 2022, the disclosure of which is incorporated herein by reference in its entirety.

BACKGROUND OF THE INVENTION

1. Field of the Invention

Embodiments relate to a biodegradable polyester resin composition, a biodegradable polyester film including the same and a biodegradable molded article including the biodegradable polyester resin composition.

2. Description of Related Art

Recently, a solution to the problem of handling various household items, especially disposable products, is required as concerns about environmental problems increase. Specifically, polymeric materials are inexpensive and have excellent processability properties, so they are widely used to manufacture various products such as films, fibers, packaging materials, bottles, containers, etc. However, polymer materials have the disadvantage that harmful substances are emitted when incinerated when the lifespan of a product is over, and it takes hundreds of years depending on the types thereof to completely decompose them naturally.

To overcome the limitations of the polymers, research on biodegradable polymers that are decomposed within a short period of time is being actively conducted. As biodegradable polymers, polylactic acid (PLA), polybutyleneadipate terephthalate (PBAT), polybutylene succinate (PBS), and the like are being used.

Such biodegradable resin compositions are disclosed in Korean Patent Application No. 2012-0103158, and the like.

SUMMARY OF THE INVENTION

Therefore, the present disclosure has been made in view of the above problems, and it is an object of the present disclosure to provide a biodegradable polyester resin composition having a high hydrolysis degree not only in soil but also in water when discarded while having an adequate initial hydrolysis degree and appropriate biodegradability; and a biodegradable polyester film including the same.

In accordance with an aspect of the present disclosure, the above and other objects can be accomplished by the provision of a biodegradable polyester resin composition, including: a polyester resin including a diol, an aromatic dicarboxylic acid and an aliphatic dicarboxylic acid; and 5000 ppm to 20000 ppm of a hydrophilic regulator having a molecular weight of 400 to 1300.

In an embodiment, the hydrophilic regulator may include an oligomer formed by reaction of at least two of the diol, the aromatic dicarboxylic acid and the aliphatic dicarboxylic acid.

In the biodegradable polyester resin composition according to an embodiment, a hydrolysis degree after one week may be 35% to 60%, and a hydrolysis degree after three weeks may be 85% or more, wherein the hydrolysis degree after one week and the hydrolysis degree after three weeks are measured by a measurement method described below:

[Measurement Method]

The hydrolysis degree after one week is a number average molecular weight reduction rate, compared to an initial number average molecular weight of the biodegradable polyester film, of the biodegradable polyester film placed for one week under high-temperature and high-humidity conditions of 80° C. and a relative humidity of 100%, and the hydrolysis degree after three weeks is a number average molecular weight reduction rate, compared to an initial number average molecular weight of the biodegradable polyester film, of the biodegradable polyester film placed for three weeks under high-temperature and high-humidity conditions of 80° C. and a relative humidity of 100%.

In an embodiment, the hydrophilic regulator may include: a first oligomer having a molecular weight of 415 to 425; a second oligomer having a molecular weight of 620 to 630; a third oligomer having a molecular weight of 640 to 650; and a fourth oligomer having a molecular weight of 840 to 850.

In an embodiment, a content of the first oligomer range from 3000 to 5000 ppm based on the polyester resin, a content of the second oligomer range from 2000 ppm to 4000 ppm based on the polyester resin, a content of the third oligomer range from 500 ppm to 2000 ppm based on the polyester resin, and a content of the fourth oligomer range from 700 ppm to 2500p ppm based on the polyester resin.

In an embodiment, the hydrophilic regulator may include a first oligomer, wherein the first oligomer includes one first unit represented by Formula 6 below and one second unit represented by Formula 7 below:

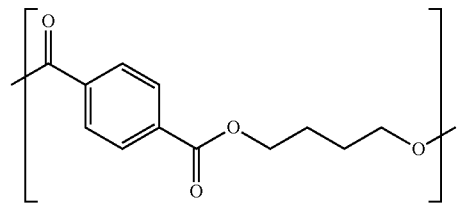

[Formula 6]

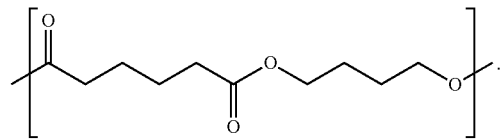

[Formula 7]

In an embodiment, the hydrophilic regulator may include a second oligomer; and a third oligomer, wherein the second oligomer includes one first unit denoted above and two second units denoted above, the third oligomer includes two first units denoted above and one second unit denoted above, and the second oligomer is included in the hydrophilic regulator in a higher content than the third oligomer.

In an embodiment, the hydrophilic regulator may further include a fourth oligomer, wherein the fourth oligomer includes two first units denoted above and two second units denoted above.

In the biodegradable polyester resin composition according to an embodiment, a water contact angle of the biodegradable polyester resin composition measured by a measurement method below may be 65° to 90°, and a polarity of the biodegradable polyester resin composition measured by a measurement method described below is 4 mN/m to 7 mN/m:

[Measurement Method]

The biodegradable polyester resin composition is dried at 80° C., placed in a stainless steel mold, and compressed at 210° C. under a pressure of 10 MPa for 3 minutes to produce a polyester sheet having a thickness of 300 μm, and the water contact angle and the polarity are measured on a surface of the polyester sheet.

In the biodegradable polyester resin composition according to an embodiment, a biodegradability of the biodegradable polyester resin composition after one week may be 45% to 65%, a biodegradability of the biodegradable polyester resin composition after nine weeks may be 85% or more, wherein the biodegradability after one week and the biodegradability after nine weeks are measured by a measurement method described below:

[Measurement Method]

The biodegradability after one week is a molecular weight reduction rate, compared to an initial molecular weight of the biodegradable polyester resin composition, of the biodegradable polyester resin composition placed at 60° C. and a relative humidity of 90% for one week under composting conditions, and the biodegradability after nine weeks is a molecular weight reduction rate, compared to an initial molecular weight of the biodegradable polyester resin composition, of the biodegradable polyester resin composition placed at 60° C. and a relative humidity of 90% for nine weeks under composting conditions.

In accordance with another aspect of the present disclosure, there is provided a biodegradable polyester resin composition, including a polyester resin including a diol, an aromatic dicarboxylic acid and an aliphatic dicarboxylic acid, a hydrolysis degree after one week is 35% to 60%, and a hydrolysis degree after three weeks is 85% or more, wherein the hydrolysis degree after one week and the hydrolysis degree after three weeks are measured by a measurement method described below:

[Measurement Method]

the hydrolysis degree after one week is a number average molecular weight reduction rate, compared to an initial number average molecular weight of the biodegradable polyester resin composition, of the biodegradable polyester resin composition placed for one week under high-temperature and high-humidity conditions of 80° C. and a relative humidity of 100%, and the hydrolysis degree after three weeks is a number average molecular weight reduction rate, compared to an initial number average molecular weight of the biodegradable polyester resin composition, of the biodegradable polyester resin composition placed for three weeks under high-temperature and high-humidity conditions of 80° C. and a relative humidity of 100%.

In the biodegradable polyester resin composition according to an embodiment, a biodegradability after nine weeks may be 85% or more, wherein the biodegradability after nine weeks is a molecular weight reduction rate, compared to an initial molecular weight of the biodegradable polyester resin composition, of the biodegradable polyester resin composition placed at 60° C. and a relative humidity of 90% for nine weeks under composting conditions.

In the biodegradable polyester resin composition according to an embodiment, a biodegradability after one week may be 45% to 75%, wherein the biodegradability after one week is a molecular weight reduction rate, compared to an initial molecular weight of the biodegradable polyester resin composition, of the biodegradable polyester resin composition placed at 60° C. and a relative humidity of 90% for one week under composting conditions.

In the biodegradable polyester resin composition according to an embodiment, a hydrolysis degree after two weeks may be 80% to 95%, wherein the hydrolysis degree after two weeks is a number average molecular weight reduction rate, compared to an initial number average molecular weight of the biodegradable polyester resin composition, of the biodegradable polyester resin composition placed for two weeks under high-temperature and high-humidity conditions of 80° C. and a relative humidity of 100%.

In the biodegradable polyester resin composition according to an embodiment, a hydrolysis degree after four weeks may be 85% or more, wherein the hydrolysis degree after four weeks is a number average molecular weight reduction rate, compared to an initial number average molecular weight of the biodegradable polyester resin composition, of the biodegradable polyester resin composition placed for four weeks under high-temperature and high-humidity conditions of 80° C. and a relative humidity of 100%, and a hydrolysis degree increase rate from one week to two weeks is 29%/week to 50%/week, and a hydrolysis degree increase rate from three weeks to four weeks is 0.01%/week to 3%/week.

In the biodegradable polyester resin composition according to an embodiment, a biodegradability after four weeks may be 73% to 85%, wherein the biodegradability after four weeks is a number average molecular weight reduction rate, compared to an initial number average molecular weight of the biodegradable polyester resin composition, of the biodegradable polyester resin composition placed for four weeks under high-temperature and high-humidity conditions of 80° C. and a relative humidity of 100%, and a biodegradability increase rate from one week to four weeks is 3.5%/week to 8%/week.

In the biodegradable polyester resin composition according to an embodiment, an acid value of the biodegradable polyester resin composition may be 2.0 mg KOH/g or less.

In the biodegradable polyester resin composition according to an embodiment, an oligomer having a molecular weight of 400 to 1300 may be included in an amount of 5000 ppm to 20000 ppm based on a total amount of the biodegradable polyester resin composition.

In the biodegradable polyester resin composition according to an embodiment, the oligomer may include the diol, the aromatic dicarboxylic acid and the aliphatic dicarboxylic acid.

In accordance with yet another aspect of the present disclosure, there is provided a biodegradable molded article, including a biodegradable resin composition, wherein the biodegradable resin composition includes a polyester resin including a diol, an aromatic dicarboxylic acid and an aliphatic dicarboxylic acid; and 5000 ppm to 20000 ppm of a hydrophilic regulator having a molecular weight of 400 to 1300.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE INVENTION

Figure 1:
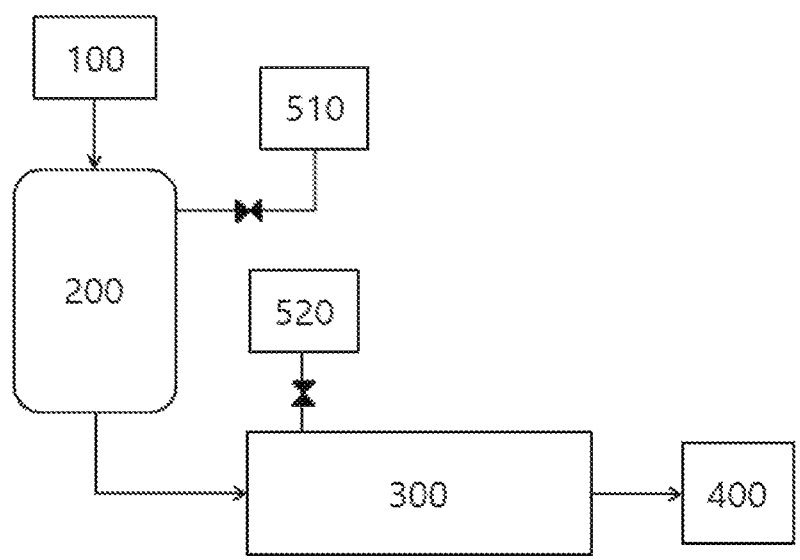
FIG. 1 is a diagram schematically illustrating an apparatus for producing a polyester resin composition according to an embodiment.

Hereinafter, the present disclosure will be described in more detail with reference to the following embodiments. The scope of the present disclosure is not limited to the following embodiments and covers modifications and equivalents of the technological aspects disclosed herein.

In the specification, when a certain part "includes" a certain component, this indicates that the part may further include another component instead of excluding another component unless there is no different disclosure.

In addition, it should be understood that all numerical ranges representing physical property values, dimensions, etc. of components described in this specification are modified by the term 'about' in all cases unless otherwise specified.

In this specification, terms such as first, second, primary, and secondary are used to describe various components, and the components are not limited by the terms. The terms are only used for the purpose of distinguishing one component from another.

In this specification, ppm is a unit based on mass. The 1 ppm is 1 in 1 million of the total mass. That is, the 1 ppm is 0.0001 wt % based on the total mass.

The biodegradable polyester resin composition according to an embodiment includes a biodegradable polyester resin. The biodegradable polyester resin composition according to an embodiment may include the biodegradable polyester resin alone or together with other resins or additives.

The biodegradable polyester resin includes a diol, an aromatic dicarboxylic acid and an aliphatic dicarboxylic acid. The biodegradable polyester resin includes a diol residue, an aromatic dicarboxylic acid residue and an aliphatic dicarboxylic acid residue. The diol residue is derived from the diol, the aromatic dicarboxylic acid residue is derived from the aromatic dicarboxylic acid, and the aliphatic dicarboxylic acid residue is derived from the aliphatic dicarboxylic acid. The biodegradable polyester resin includes a diol component, an aromatic dicarboxylic acid component and an aliphatic dicarboxylic acid component. Likewise, the diol component may be derived from the diol, the aromatic dicarboxylic acid component may be derived from the aromatic dicarboxylic acid, and the aliphatic dicarboxylic acid component may be derived from the aliphatic dicarboxylic acid.

In a description of the biodegradable polyester resin composition according to an embodiment, a diol residue may be expressed as a diol. In the biodegradable polyester resin, a dicarboxylic acid residue may be expressed as dicarboxylic acid. In addition, the residue may be expressed as a component.

The diol may be an aliphatic diol. The diol may be a bio-derived diol. The diol may be at least one selected from the group consisting of ethanediol, 1,2-propanediol, 1,3-propanediol, 2-methyl-1,3-propanediol, 2,2-dimethyl-1,3-propanediol, 2,2-diethyl-1,3-propanediol, 2-ethyl-2-isobutyl-1,3-propanediol, 1,2-butanediol, 1,4-butanediol, 1,5-pentanediol, 3-methyl-1,5-pentanediol, 2,2,4-trimethyl-1,3-pentanediol, 1,6-hexanediol, 2-ethyl-1,3-hexanediol, 2,4-dimethyl-2-ethyl-1,3-hexanediol, 2,2,4-trimethyl-1,6-hexanediol, 2-methyl-1,8-octanediol, 1,9-nonanediol, 1,10-decanediol and 1,12-octadecanediol or derivatives thereof.

The diol may be at least one selected from the group consisting of 1,4-butanediol, 1,2-ethanediol, 1,3-propanediol, diethylene glycol and neopentyl glycol or derivatives thereof.

The diol may be at least one selected from the group consisting of 1,4-butanediol, 1,2-ethanediol, 1,3-propanediol or derivatives thereof.

The diol may include 1,4-butanediol or a derivative thereof.

The aromatic dicarboxylic acid may be at least one selected from the group consisting of phthalic acid, terephthalic acid, isophthalic acid, 1,4-naphthalenedicarboxylic acid, 1,5-naphthalenedicarboxylic acid, 2,6-naphthalenedicarboxylic acid, 1,8-naphthalenedicarboxylic acid, 4,4'-diphenyl dicarboxylic acid, 4,4'-diphenyl ether dicarboxylic acid, anthracen dicarboxylic acid, and phenanthren dicarboxylic acid or derivatives thereof.

The aromatic dicarboxylic acid may be at least one selected from the group consisting of terephthalic acid, dimethyl terephthalate, 2,6-naphthalene dicarboxylic acid, isophthalic acid or derivatives thereof.

The aromatic dicarboxylic acid may include terephthalic acid, dimethyl terephthalate or a derivative thereof.

The aliphatic dicarboxylic acid may be at least one selected from the group consisting of oxalic acid, malonic acid, succinic acid, maleic acid, fumaric acid, glutaric acid, adipic acid, pimelic acid, serveric acid, azelaic acid, sebacic acid, dodecanedicarboxylic acid and 1,4-cyclohexanedicarboxylic acid or derivatives thereof.

The aliphatic dicarboxylic acid may be at least one selected from the group consisting of adipic acid, succinic acid and sebacic acid or derivatives thereof.

The aliphatic dicarboxylic acid may include an adipic acid or a derivative thereof.

In the biodegradable polyester resin, a molar ratio of all diol residues including the diol to all dicarboxylic acid residues including the aromatic dicarboxylic acid and the aliphatic dicarboxylic acid may range from about 1:0.9 to about 1:1.1. A molar ratio of all diol residues to all dicarboxylic acid residues may range from about 1:0.95 to about 1:1.05.

In the biodegradable polyester resin, a molar ratio of the aromatic dicarboxylic acid residue to the aliphatic dicarboxylic acid residue may range from about 3:7 to about 7:3. In the biodegradable polyester resin, a molar ratio of the aromatic dicarboxylic acid residue to the aliphatic dicarboxylic acid residue may range from about 3.3:6.7 to about 6.7:3.3. In the biodegradable polyester resin, a molar ratio of the aromatic dicarboxylic acid residue to the aliphatic dicarboxylic acid residue may range from about 4:6 to about 6:4. In the biodegradable polyester resin, a molar ratio of the aromatic dicarboxylic acid residue to the aliphatic dicarboxylic acid residue may range from about 4.2:5.8 to about 5:5.

The biodegradable polyester resin may include a diol residue derived from 1,4-butanediol in a content ranging from about 90 mol % or more based on the total diol. The biodegradable polyester resin may include a diol residue derived from 1,4-butanediol in a content ranging from about 95 mol % or more based on the total diol. The biodegradable polyester resin may include a diol residue derived from 1,4-butanediol in a content ranging from about 98 mol % or more based on the total diol.

The biodegradable polyester resin may include an aromatic dicarboxylic acid residue derived from terephthalic acid or dimethyl terephthalate in a content ranging from about mol % to about 70 mol % based on the total dicarboxylic acid. The biodegradable polyester resin may include an aromatic dicarboxylic acid residue derived from terephthalic acid or dimethyl terephthalate in a content ranging from about 35 mol % to about 65 mol % based on the total dicarboxylic acid. The biodegradable polyester resin may include a dicarboxylic acid residue derived from terephthalic acid or dimethyl terephthalate in a content ranging from about 40 mol % to about 59 mol % based on the total dicarboxylic acid. The biodegradable polyester resin may include an aromatic dicarboxylic acid residue derived from terephthalic acid or dimethyl terephthalate in a content ranging from about 43 mol % to about 53 mol % based on the total dicarboxylic acid.

The biodegradable polyester resin may include an aliphatic dicarboxylic acid residue derived from adipic acid in a content ranging from about 30 mol % to about 70 mol % based on the total dicarboxylic acid. The biodegradable polyester resin may include an aliphatic dicarboxylic acid residue derived from adipic acid in a content ranging from about 35 mol % to about 65 mol % based on the total dicarboxylic acid. The biodegradable polyester resin may include an aliphatic dicarboxylic acid residue derived from adipic acid in a content ranging from about 41 mol % to about 60 mol % based on the total dicarboxylic acid. The biodegradable polyester resin may include an aliphatic dicarboxylic acid residue derived from adipic acid in a content ranging from about 47 mol % to about 57 mol % based on the total dicarboxylic acid.

In addition, the biodegradable polyester resin may include at least one first block and at least one second block. The biodegradable polyester resin may have a molecular structure in which the first block and the second block are alternately bonded.

The first block may include the diol residue and the aromatic dicarboxylic acid residue. The first block may be formed by esterification of the diol and the aromatic dicarboxylic acid. The first block may include only the diol residue and the aromatic dicarboxylic acid residue. The first block may include only repeating units formed by the esterification of the diol and the aromatic dicarboxylic acid. That is, the first block may mean the sum of repeating units of the diol and the aromatic dicarboxylic acid before being combined with the aliphatic dicarboxylic acid.

The second block may include the diol residue and the aliphatic dicarboxylic acid residue. The second block may be formed by esterification of the diol and the aliphatic dicarboxylic acid. The second block may include only the diol residue and the aliphatic dicarboxylic acid residue. The second block may include only repeating units formed by the esterification of the diol and the aliphatic dicarboxylic acid. That is, the second block may mean the sum of repeating units of the diol and the aliphatic dicarboxylic acid before being combined with the aromatic dicarboxylic acid.

In the biodegradable polyester resin, a ratio (X/Y) of the number (X) of the first blocks to the number (Y) of the second blocks may range from about 0.5 to about 1.5. In the biodegradable polyester resin, the ratio (X/Y) of the number (X) of the first blocks to the number (Y) of the second blocks may range from about 0.6 to about 1.4. In the biodegradable polyester resin, the ratio (X/Y) of the number (X) of the first blocks to the number (Y) of the second blocks may range from about 0.7 to about 1.3. In the biodegradable polyester resin, the ratio (X/Y) of the number (X) of the first blocks to the number (Y) of the second blocks may range from about 0.75 to about 1.2. In addition, in the biodegradable polyester resin, the ratio (X/Y) of the number (X) of the first blocks to the number (Y) of the second blocks may be 0.8 to 1. The number of the first blocks may be smaller than the number of the second blocks.

The number of the first blocks may range from about 30 to about 300. The number of the first blocks may range from about 40 to about 250. The number of the first blocks may range from about 50 to about 220. The number of the first blocks may range from about 60 to about 200. The number of the first blocks may range from about 70 to about 200. The number of the first blocks may range from about 75 to about 200.

The number of the first blocks may vary depending upon the content of the aromatic dicarboxylic acid, the molecular weight of the biodegradable polyester resin and an alternation ratio to be described below. That is, the number of the first blocks may increase as a molar ratio of the aromatic dicarboxylic acid increases, as the molecular weight of the biodegradable polyester resin increases, and as an alternation ratio to be described below increases.

The number of the second blocks may range from about 30 to about 300. The number of the second blocks may range from about 40 to about 250. The number of the second blocks may range from about 50 to about 220. The number of the second blocks may range from about 60 to about 200. The number of the second blocks may range from about 70 to about 200. The number of the second blocks may range from about 75 to about 200.

The number of the second blocks may vary depending upon the content of the aliphatic dicarboxylic acid, the molecular weight of the biodegradable polyester resin and a polymerization process described below. That is, the molecular weight of the biodegradable polyester resin may increase as the molar ratio of the aliphatic dicarboxylic acid increases, so that the number of the first blocks may increase.

When the biodegradable polyester resin includes the first block and the second block within the specified range above, the biodegradable polyester resin composition according to an embodiment may have appropriate biodegradability while having appropriate mechanical strength. In addition, when the biodegradable polyester resin includes the first block and the second block within the specified range above, the biodegradable polyester resin composition according to an embodiment may have improved stiffness while having improved flexibility. Accordingly, the biodegradable polyester resin composition according to an embodiment may be used for an injection-molded article, etc. In addition, when the biodegradable polyester resin includes the first block and the second block within the specified range above, the biodegradable polyester resin composition according to an embodiment may have appropriate biodegradability while having appropriate durability to ultraviolet light, and the like.

The first block may be represented by Formula 1 below:

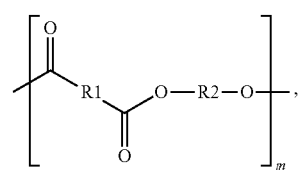

[Formula 1]

where R1 is a substituted or unsubstituted arylene group having 6 to 20 carbon atoms, R2 is a substituted or unsubstituted alkylene group having 1 to 20 carbon atoms, and m is 1 to 20.

R1 may be a substituted or unsubstituted phenylene group, and R2 may be a butylene group.

The second block may be represented by Formula 2 below:

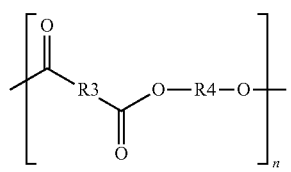

[Formula 2]

where R3 and R4 are each independently a substituted or unsubstituted alkylene group having 1 to 20 carbon atoms, and n is 1 to 20.

R3 and R4 may be a butylene group.

The biodegradable polyester resin may have a structure in which the first block and the second block are alternately bonded to each other. The biodegradable polyester resin may be represented by Formula 3 below.

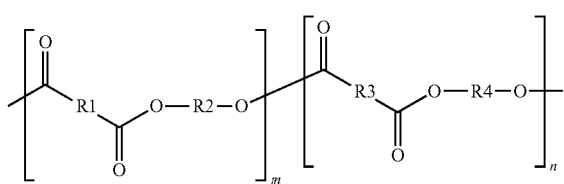

[Formula 3]

where R1 is a substituted or unsubstituted arylene group having 6 to 20 carbon atoms, R2 is a substituted or unsubstituted alkylene group having 1 to 20 carbon atoms, and m is 1 to 20. In addition, R3 and R4 are each independently a substituted or unsubstituted alkylene group having 1 to 20 carbon atoms, and n is 1 to 20.

The diol residue may include a residue of 1,4-butanediol or derivative thereof, the aromatic dicarboxylic acid residue may include a residue of terephthalic acid or derivative thereof, and the aliphatic dicarboxylic acid residue may include a residue of adipic acid or derivative thereof.

For example, the biodegradable polyester resin may include a first block including a residue of 1,4-butanediol or derivative thereof and a residue of terephthalic acid or derivative thereof.

Alternatively, the biodegradable polyester resin may include a first block including a residue of 1,4-butanediol or derivative thereof and a residue of dimethyl terephthalate or derivative thereof.

The biodegradable polyester resin may include a second block including a residue of 1,4-butanediol or derivative thereof and a residue of adipic acid or derivative thereof.

Alternatively, the biodegradable polyester resin may include a second block including a residue of 1,4-butanediol or derivative thereof and a residue of succinic acid or derivative thereof.

A biodegradable polyester resin according to an embodiment of the present disclosure may include a first block including a residue of 1,4-butanediol or derivative thereof and a residue of terephthalic acid or derivative thereof; and a second block including a residue of 1,4-butanediol or derivative thereof and a residue of adipic acid or derivative thereof.

The first block may be represented by Formula 4 below, and the second block may be represented by Formula 5 below:

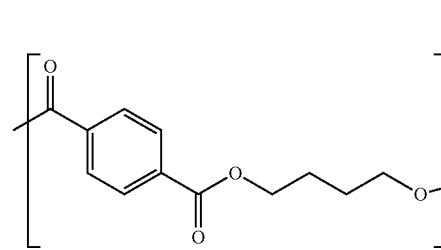

[Formula 4]

where m is 1 to 20.

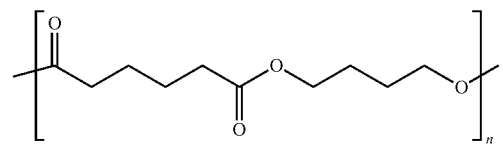

[Formula 5]

where n is 1 to 20.

The biodegradable polyester resin may be represented by Formula 6 below:

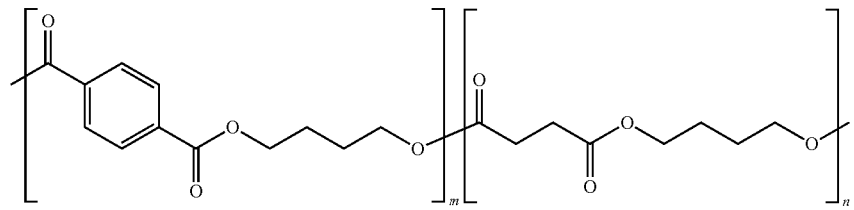

[Formula 6]

where m is 1 to 20, and n is 1 to 20.

When m of the first block and n of the second block falls within the specified range, it may be more advantageous to provide a biodegradable polyester sheet, film or molded article having excellent biodegradability and water degradability and improved properties.

In addition, when the biodegradable polyester resin includes the first block and the second block within the specified range above, the biodegradable polyester resin composition according to an embodiment may have appropriate mechanical properties and appropriate UV resistance.

Since the first and second blocks have the characteristics, the mechanical properties of the biodegradable polyester resin composition according to an embodiment may be improved.

Since the first and second blocks have the characteristics, the biodegradable polyester resin composition according to an embodiment may have appropriate UV resistance, biodegradation rate, and hydrolysis rate.

The biodegradable polyester resin may further include a branching agent. The branching agent may include at least one selected from the group consisting of a trihydric or higher alcohol, an anhydride and a trihydric or higher carboxylic acid. The branching agent may react with the diol, the aromatic dicarboxylic acid and the aliphatic dicarboxylic acid. Accordingly, the branching agent may be included as a part of the molecular structure of the biodegradable polyester resin.

The trihydric or higher alcohol may be at least one selected from the group consisting of glycerol, pentaerythritol or trimethylolpropane.

The trihydric or higher carboxylic acid may be at least one selected from the group consisting of methane tricarboxylic acid, ethanetricarboxylic acid, citric acid, benzene-1,3,5-tricarboxylic acid, 5-sulfo-1,2,4-benzenetricarboxylic acid, ethane-1,1,2,2-tetracarboxylic acid, propane-1,1,2,3-tetracarboxylic acid, butane-1,2,3,4-tetracarboxylic acid, cyclopentane-1,2,3,4-tetracarboxylic acid and benzene-1,2,4,5-tetracarboxylic acid.

The anhydride may include at least one selected from the group consisting of trimellitic anhydride, succinic anhydride, methyl succinic anhydride, ethylsuccinic anhydride, 2,3-butanedicarboxylic anhydride, 2,4-pentanedicarboxylic anhydride, 3,5-heptanedicarboxylic anhydride, 1,2,3,4-butanetetracarboxylic dianhydride, maleic anhydride, dodecyl succinic anhydride and pyromellitic anhydride.

The branching agent may be included in a content ranging from about 0.1 wt % to about 5 wt % in the biodegradable polyester resin based on the total amount of the biodegradable polyester resin. The branching agent may be included in a content ranging from about 0.1 wt % to about 3 wt % in the biodegradable polyester resin based on the total amount of the biodegradable polyester resin. The branching agent may be included in a content ranging from about 0.1 wt % to about 1 wt % in the biodegradable polyester resin based on the total amount of the biodegradable polyester resin.

Since the biodegradable polyester resin includes the branching agent within the specified range above, the biodegradable polyester resin composition according to an embodiment may have appropriate mechanical characteristics and appropriate biodegradability.

The biodegradable polyester resin composition according to an embodiment may include the biodegradable resin in a content ranging from about 30 wt % or more based on the total weight of the composition. The biodegradable polyester resin composition according to an embodiment may include the biodegradable resin in a content ranging from about 50 wt % or more based on the total weight of the composition. The biodegradable polyester resin composition according to an embodiment may include the biodegradable resin in a content ranging from about 70 wt % or more based on the total weight of the composition. The biodegradable polyester resin composition according to an embodiment may include the biodegradable resin in a content ranging from about 80 wt % or more based on the total weight of the composition. The biodegradable polyester resin composition according to an embodiment may include the biodegradable resin in a content ranging from about 90 wt % or more based on the total weight of the composition. The biodegradable polyester resin composition according to an embodiment may include the biodegradable resin in a content ranging from about 95 wt % or more based on the total weight of the composition. The biodegradable polyester resin composition according to an embodiment may include the biodegradable resin in a content ranging from about 99 wt % or more based on the total weight of the composition. A maximum content of the biodegradable resin in the biodegradable polyester resin composition according to an embodiment may range from about 100 wt % based on the total weight of the composition.

The biodegradable polyester resin composition according to an embodiment may further include a reinforcing material. The reinforcing material may improve the mechanical properties of the biodegradable polyester resin composition according to an embodiment and the mechanical properties of a film or molded article made of the composition. In addition, the reinforcing material may control the deformation characteristics of the biodegradable polyester resin composition according to an embodiment due to ultraviolet rays. In addition, the reinforcing material may control the hydrolysis characteristics of the biodegradable polyester resin composition according to an embodiment. In addition, the reinforcing material may control the biodegradability of the biodegradable polyester resin according to an embodiment.

The reinforcing material may be a fiber derived from biomass. The reinforcing material may be a fiber made of an organic material. The reinforcing material may be nanocellulose.

The nanocellulose may be one or more selected from the group consisting of nanocrystalline cellulose, cellulose nanofiber, microfibrillated cellulose, hydroxymethyl cellulose, hydroxyethyl cellulose, hydroxypropyl cellulose, hydroxypropylmethyl cellulose, cellulose acetate, methyl cellulose, ethyl cellulose, propyl cellulose, butyl cellulose, pentyl cellulose, hexyl cellulose and cyclohexyl cellulose.

The nanocellulose may include an ion-bonded metal. The nanocrystalline cellulose may include elemental sodium. In addition, the nanocrystalline cellulose may include sulphate.

The nanocrystalline cellulose may include a carboxylate. The nanocrystalline cellulose may include a cellulose hydrogen sulphate sodium salt (Cellulose hydrogen sulphate sodium salt.

The nanocellulose may be represented by Formula 7 below:

where x is 1 to 35, and y is 1 to 10.

The specific surface area of the nanocellulose may range from about 200 m$^2$/g to about 600 m$^2$/g. The specific surface area of the nanocellulose may range from about 250 m$^2$/g to about 500 m$^2$/g.

The weight average molecular weight of the nanocellulose may range from about 10000 g/mol to about 40000 g/mol. The weight average molecular weight of the nanocrystalline cellulose may range from about 11000 g/mol to about 35000 g/mol.

The moisture content of the nanocrystalline cellulose may range from about 2 wt % to about 8 wt %. The moisture content of the nanocrystalline cellulose may range from about 4 wt % to about 6 wt %.

The average diameter of the nanocellulose may range from about 0.5 nm to about nm. The average diameter of the nanocellulose may range from about 1 nm to about 8 nm. The average diameter of the nanocellulose may range from about 1.5 nm to about 7 nm.

The average length of the nanocellulose may range from about 20 nm to about 300 nm. The average length of the nanocellulose may range from about 30 nm to about 180 nm. The average length of the nanocellulose may range from about 35 nm to about 150 nm.

When the diameter and length of the nanocellulose satisfy the ranges, the biodegradability and properties of the biodegradable polyester resin or the biodegradability and properties of a biodegradable polyester sheet, film and molded article made using the biodegradable polyester resin may be further improved.

The diameter and length of the nanocellulose may be measured by atomic force microscopy in a water-dispersed state.

The sulfur content of the nanocellulose may range from about 0.1 wt % to about 1.2 wt % based on the total amount of the nanocrystalline cellulose. The sulfur content of the nanocellulose may range from about 0.2 wt % to about 1.1 wt % based on the total amount of the nanocellulose.

The pH of the nanocellulose may be 5 to 8. The pH of the nanocellulose may be 6 to 8.

The zeta potential of the nanocellulose may range from about −25 mV to about −50 mV. The zeta potential of the nanocellulose may range from about −30 mV to about −45 mV.

The nanocellulose may be included in a content ranging from about 0.01 parts by weight to about 2 parts by weight in the biodegradable polyester resin composition according to an embodiment based on 100 parts by weight of the biodegradable polyester resin. The nanocellulose may be included in a content ranging from about 0.03 parts by weight to about 1.5 parts by weight in the biodegradable polyester resin composition according to an embodiment based on 100 parts by weight of the biodegradable polyester resin. The nanocellulose may be included in a content ranging from about 0.04 parts by weight to about 1.2 parts by weight in the biodegradable polyester resin composition according to an embodiment based on 100 parts by weight of the biodegradable polyester resin. The nanocellulose may be included in a content ranging from about 0.05 parts by weight to about 1 part by weight in the biodegradable polyester resin composition according to an embodiment based on 100 parts by weight of the biodegradable polyester resin.

Since the nanocellulose has the aforementioned characteristics, it may be uniformly dispersed in the biodegradable polyester resin composition according to an embodiment.

Since the nanocellulose has the aforementioned characteristics, it may improve the mechanical properties of the biodegradable polyester resin composition according to an embodiment.

In addition, the nanocellulose severs as a nucleating agent, thereby being capable of improving the crystallization rate of the biodegradable polyester resin composition according to an embodiment. Accordingly, the nanocellulose may increase the crystallization temperature of the biodegradable polyester resin composition according to an embodiment.

Since the nanocellulose has the characteristics, the biodegradable polyester resin composition according to an embodiment may have appropriate UV resistance.

Since the nanocellulose has the characteristics, the biodegradable polyester resin composition according to an embodiment may have an appropriate biodegradation rate.

Since the nanocellulose has the characteristics, the biodegradable polyester resin composition according to an embodiment may have an appropriate hydrolysis rate.

The biodegradable polyester resin composition according to an embodiment may include a metal salt.

The metal salt may be included in a content ranging from about 0.1 ppm to about 1000 ppm based on the total weight of the biodegradable polyester resin composition according to an embodiment. The metal salt may be included in a content ranging from about 1 ppm to about 500 ppm based on the total weight of the biodegradable polyester resin composition according to an embodiment. The metal salt may be included in a content ranging from about 1 ppm to about 100 ppm based on the total weight of the biodegradable polyester resin composition according to an embodiment. The metal salt may be included in a content ranging from about 1 ppm to about 50 ppm based on the total weight of the biodegradable polyester resin composition according to an embodiment.

The metal salt may be at least one selected from the group consisting of a nitrate, a sulfate, hydrochloride, a carboxylate and the like. The metal salt may be at least one selected from the group consisting of titanium salt, silicon salt, sodium salt, calcium salt, potassium salt, magnesium salt, copper salt, iron salt, aluminum salt, silver salt and the like. The metal salt may be at least one selected from the group consisting of magnesium acetate, calcium acetate, potassium acetate, copper nitrate, silver nitrate, sodium nitrate, and the like.

The metal salt may include one or more selected from the group consisting of iron (Fe), magnesium (Mg), nickel (Ni), cobalt (Co), copper (Cu), palladium (Pd), zinc (Zn), vanadium (V), titanium, (Ti), indium (In), manganese (Mn), silicon (Si) and tin (Sn).

In addition, the metal salt may be selected from the group consisting of acetate, nitrate, nitride, sulfide, sulfate, sulfoxide, hydroxide, hydrate, chloride, chlorinate and bromide.

Since the biodegradable polyester resin composition according to an embodiment includes the metal salt within the specified content above, a hydrolysis rate and a biodegradation rate may be appropriately controlled.

Since the biodegradable polyester resin composition according to an embodiment includes the metal salt within the specified content above, a hydrolysis rate and a biodegradation rate may be appropriately controlled.

The biodegradable polyester resin composition according to an embodiment may further include an anti-hydrolysis agent.

The anti-hydrolysis agent may be at least one selected from among silicone-based compounds such as silane, silazane and siloxane.

The anti-hydrolysis agent may include alkoxy silane. The anti-hydrolysis agent may include trimethoxy silane and/or triethoxy silane. The anti-hydrolysis agent may include alkoxy silane including an epoxy group. The anti-hydrolysis agent may include at least one selected from the group consisting of 2-(3,4-epoxycyclohexyl) ethyltrimethoxysilane, 3-glycidoxypropyl methyldimethoxysilane, 3-glycidoxypropyl trimethoxysilane, 3-glycidoxypropyl methyldiethoxysilane and 3-glycidoxypropyl triethoxysilane.

The anti-hydrolysis agent may be included in a content ranging from about 1 ppm to about 10000 ppm in the biodegradable polyester resin composition according to an embodiment. The anti-hydrolysis agent may be included in a content ranging from about 1 ppm to about 1000 ppm in the biodegradable polyester resin composition according to an embodiment. The anti-hydrolysis agent may be included in a content ranging from about 5 ppm to 500 ppm in the biodegradable polyester resin composition according to an embodiment. The anti-hydrolysis agent may be included in a content ranging from about 10 ppm to 300 ppm in the biodegradable polyester resin composition according to an embodiment.

The anti-hydrolysis agent may be bonded to the biodegradable polyester resin. The anti-hydrolysis agent may be chemically bonded to the biodegradable polyester resin. The anti-hydrolysis agent may be chemically bonded to a polymer included in the biodegradable polyester resin. The anti-hydrolysis agent may couple polymers included in the biodegradable polyester resin.

Since the biodegradable polyester resin composition according to an embodiment includes the anti-hydrolysis agent within the specified range above, it may have appropriate hydrolysis resistance. In particular, since the biodegradable polyester resin according to an embodiment includes the anti-hydrolysis agent within the specified range above, it may have appropriate initial hydrolysis characteristics and improved biodegradability.

Accordingly, the biodegradable polyester resin composition according to an embodiment may include a silicon element. The biodegradable polyester resin composition according to an embodiment may include the silicon element in a content ranging from about 1 ppm to about 150 ppm. The biodegradable polyester resin composition according to an embodiment may include the silicon element in a content ranging from about 0.1 ppm to about 100 ppm. The biodegradable polyester resin composition according to an embodiment may include the silicon element in a content ranging from about 0.1 ppm to about 50 ppm. The biodegradable polyester resin composition according to an embodiment may include the silicon element in a content ranging from about 0.1 ppm to about 20 ppm.

In addition, the anti-hydrolysis agent may also react with a terminal carboxyl group or an unreacted carboxyl group. Accordingly, the biodegradable polyester resin composition according to an embodiment may have a low acid value.

In addition, the anti-hydrolysis agent may couple polymers included in the biodegradable polyester resin, so that the biodegradable polyester resin composition according to an embodiment may increase the ratio of high-molecular-weight polymers. Accordingly, the mechanical properties of the biodegradable polyester resin composition according to an embodiment may be improved.

The biodegradable polyester resin composition according to an embodiment may further include a chain extender.

The chain extender may include isocyanate.

The chain extender may be at least one selected from the group consisting of monofunctional isocyanate or polyfunctional isocyanate.

The chain extender may be at least one selected from the group consisting of tolylene 2,4-diisocyanate, tolylene 2,6-diisocyanate, diphenylmethane 4,4'-diisocyanate and 2,4'-diisocyanate, naphthalene 1,5-diisocyanate, xylylene diisocyanate, hexamethylene diisocyanate, pentamethylene diisocyanate, isophorone diisocyanate and methylenebis(4-isocyanatocyclohexane).

The chain extender may include triisocyanate. The chain extender may include tri(4-isocyanatophenyl)methane.

The chain extender may include an acrylic polymer. The acrylic polymer may include an acryl group. The acryl group may be bonded to a main chain as a side chain. The acrylic polymer may include an epoxy group. The epoxy group may be bonded to the main chain as a side chain.

The chain extender may include a styrene-based polymer. The chain extender may include a styrene-based glycidyl acrylate.

The chain extender may be chemically bonded to the biodegradable polyester resin. The chain extender may be chemically bonded to a polymer included in the biodegradable polyester resin. The chain extender may be bonded to a terminal of the polymer included in the biodegradable polyester resin. In addition, the chain extender may be bonded to terminals of three polymers included in the biodegradable polyester resin.

The chain extender may be a terminal capping agent for capping a terminal of the polymer.

The chain extender may be included in the biodegradable polyester resin composition according to an embodiment in a content ranging from about 0.1 wt % to about 10 wt % based on the total amount of the composition. The chain extender may be included in the biodegradable polyester resin composition according to an embodiment in a content ranging from about 0.2 wt % to about 8 wt % based on the total amount of the composition. The chain extender may be included in the biodegradable polyester resin composition according to an embodiment in a content ranging from about 0.3 wt % to about 7 wt % based on the total amount of the composition.

When the biodegradable polyester resin composition according to an embodiment includes the chain extender within the specified range above, it may have appropriate hydrolysis resistance and appropriate biodegradability.

In addition, the chain extender may react with a terminal carboxyl group or an unreacted carboxyl group. Accordingly, the biodegradable polyester resin composition according to an embodiment may have a low acid value.

In addition, the chain extender couples polymers included in the biodegradable polyester resin, so that the biodegradable polyester resin composition according to an embodiment may increase the ratio of high-molecular-weight polymers. Accordingly, the mechanical properties of the biodegradable polyester resin composition according to an embodiment may be improved.

The biodegradable polyester resin composition according to an embodiment may include an oligomer. The molecular weight of the oligomer may range from about 400 to about 1300.

The oligomer may be included in the biodegradable polyester resin composition according to an embodiment in a content ranging from about 3000 ppm to about 30000 ppm based on the total amount of the resin composition. The oligomer may be included in the biodegradable polyester resin composition according to an embodiment in a content ranging from about 5000 ppm to about 20000 ppm based on the total amount of the resin composition. The oligomer may be included in the biodegradable polyester resin composition according to an embodiment in a content ranging from about 5000 ppm to about 15000 ppm based on the total amount of the resin composition. The oligomer may be included in the biodegradable polyester resin composition according to an embodiment in a content ranging from about 7000 ppm to about 15000 ppm based on the total amount of the resin composition.

The oligomer may be a reaction product of at least two or more of the diol, the aromatic dicarboxylic acid and the aliphatic dicarboxylic acid. The oligomer may be a reaction product of 1,4-butanediol, terephthalic acid and adipic acid.

The oligomer may include an oligomer in which a molar ratio of the aliphatic dicarboxylic acid is higher than that of the aromatic dicarboxylic acid. In the oligomer, a ratio of an oligomer containing a relatively large amount of the aliphatic dicarboxylic acid may be higher than a ratio of an oligomer containing a relatively large amount of the aromatic dicarboxylic acid.

The oligomer may include a first oligomer, a second oligomer, a third oligomer and a fourth oligomer.

The first oligomer may have a molecular weight of 415 to 425. The first oligomer may have a molecular weight of 419 to 424.

The first oligomer may be a reaction product formed by reacting two 1,4-butanediol molecules, one terephthalic acid molecule and one adipic acid molecule. That is, the first oligomer may include the 1,4-butanediol, the terephthalic acid and the adipic acid in a molar ratio of 2:1:1. In addition, the first oligomer may have four ester bonds. The first oligomer may have a ring structure.

In addition, the first oligomer may include one first unit represented by Formula 6 below and one second unit represented by Formula 7 below:

[Formula 6]

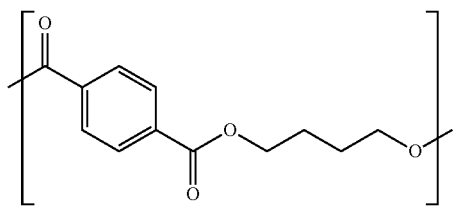

[Formula 7]

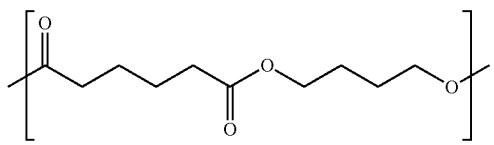

The first oligomer may have a ring structure. The first oligomer may include the first and second units and may have a ring structure.

The first oligomer may be represented by Formula 8 below:

[Formula 8]

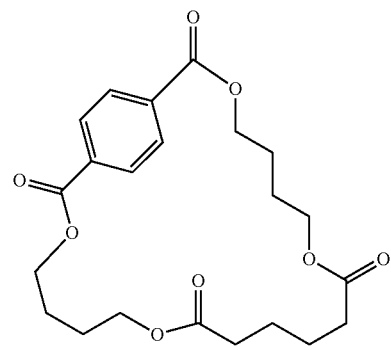

The content of the first oligomer may range from about 1000 ppm to about 6000 ppm based on the total amount of the biodegradable polyester resin composition according to an embodiment. The content of the first oligomer may range from about 1500 ppm to about 5000 ppm based on the total amount of the biodegradable polyester resin composition according to an embodiment. The content of the first oligomer may range from about 2000 ppm to about 4500 ppm based on the total amount of the biodegradable polyester resin composition according to an embodiment. The content of the first oligomer may range from about 2500 ppm to about 5000 ppm based on the total amount of the biodegradable polyester resin composition according to an embodiment.

The second oligomer may have a molecular weight of 620 to 630. The second oligomer may have a molecular weight of 621 to 626.

The second oligomer may be a reaction product formed by reacting three 1,4-butanediol molecules, one terephthalic acid molecule and two adipic acid molecules. That is, the second oligomer may include the 1,4-butanediol, the terephthalic acid and the adipic acid in a molar ratio of 3:1:2. In addition, the second oligomer may have six ester bonds.

The second oligomer may include one first unit represented by the above Formula 6 and two second units represented by the above Formula 7.

The second oligomer may be at least one selected from the group consisting of Formulas 9, 10 and 11 below:

[Formula 9]

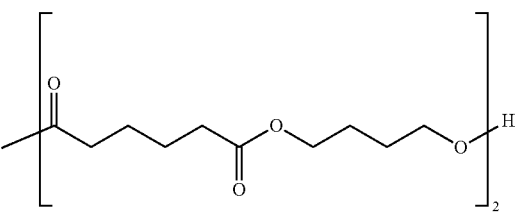

[Formula 10]

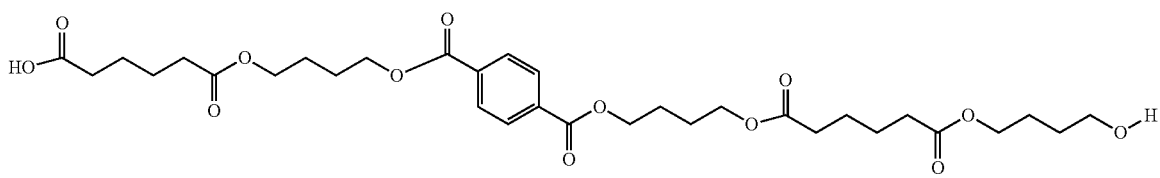

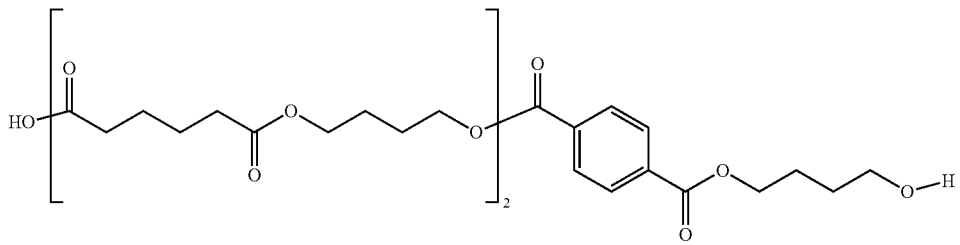

[Formula 11]

The content of the second oligomer may range from about 1000 ppm to about 5000 ppm based on the total amount of the biodegradable polyester resin composition according to an embodiment. The content of the second oligomer may range from about 1200 ppm to about 4500 ppm based on the total amount of the biodegradable polyester resin composition according to an embodiment. The content of the second oligomer may range from about 1500 ppm to about 4000 ppm based on the total amount of the biodegradable polyester resin composition according to an embodiment. The content of the second oligomer may range from about 2000 ppm to about 3800 ppm based on the total amount of the biodegradable polyester resin composition according to an embodiment.

The third oligomer may have a molecular weight of 640 to 650. The third oligomer may have a molecular weight of 641 to 645.

The third oligomer may be a reaction product formed by reacting three 1,4-butanediol molecules, two terephthalic acid molecules and one adipic acid molecule. That is, the third oligomer may include the 1,4-butanediol, the terephthalic acid and the adipic acid in a molar ratio of 3:2:1. In addition, the third oligomer may have six ester bonds.

The third oligomer may include two first units represented by the above Formula 6 and one second unit represented by the above Formula 7.

The third oligomer may be at least one selected from the group consisting of Formulas 12, 13 and 14 below:

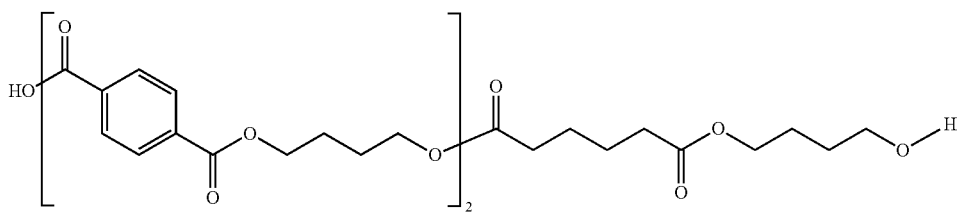

[Formula 12]

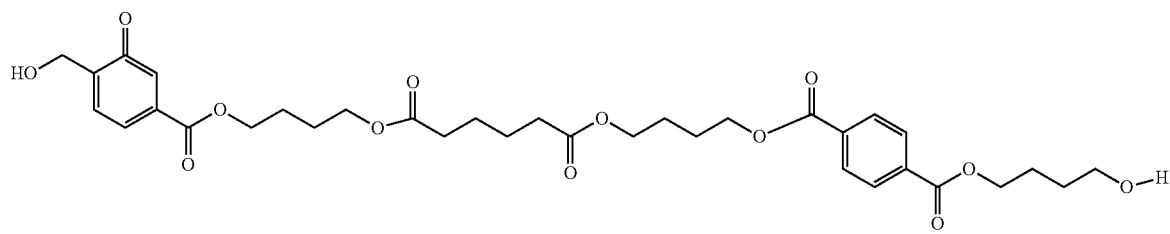

[Formula 13]

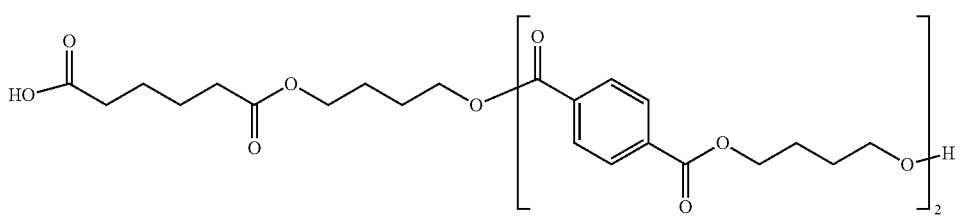

[Formula 14]

The content of the third oligomer may range from about 300 ppm to about 3000 ppm based on the total amount of the biodegradable polyester resin composition according to an embodiment. The content of the third oligomer may range from about 500 ppm to about 2500 ppm based on the total amount of the biodegradable polyester resin composition according to an embodiment. The content of the third oligomer may range from about 700 ppm to about 2000 ppm based on the total amount of the biodegradable polyester resin composition according to an embodiment. The content of the third oligomer may range from about 800 ppm to about 1800 ppm based on the total amount of the biodegradable polyester resin composition according to an embodiment.

The fourth oligomer may have a molecular weight of 840 to 850. The fourth oligomer may have a molecular weight of 841 to 845.

The fourth oligomer may include a reaction product formed by reacting four 1,4-butanediol molecules, two terephthalic acid molecules and two adipic acid molecules. That is, the fourth oligomer may include the 1,4-butanediol, the terephthalic acid and the adipic acid in a molar ratio of 4:2:2. In addition, the fourth oligomer may have eight ester bonds.

The fourth oligomer may include two first units represented by the above Formula 6 and two second units represented by the above Formula 7.

In addition, the fourth oligomer may include at least one of the following bonded structures:

First unit-first unit-second unit-second unit,
First unit-second unit-first unit-second unit,
First unit-second unit-second unit-first unit, or
Second unit-first unit-first unit-second unit.

The content of the fourth oligomer may range from about 300 ppm to about 3500 ppm based on the total amount of the biodegradable polyester resin composition according to an embodiment. The content of the fourth oligomer may range from about 500 ppm to about 3000 ppm based on the total amount of the biodegradable polyester resin composition according to an embodiment. The content of the fourth oligomer may range from about 700 ppm to about 2500 ppm based on the total amount of the biodegradable polyester resin composition according to an embodiment. The content of the fourth oligomer may range from about 800 ppm to about 2000 ppm based on the total amount of the biodegradable polyester resin composition according to an embodiment.

A ratio (the content of the first oligomer/the content of the total oligomers) of the first oligomer based on the total oligomers may range from about 0.20 to about 0.5. The ratio of the first oligomer based on the total oligomers may range from about 0.25 to about 0.45. The ratio of the first oligomer based on the total oligomers may range from about 0.30 to about 0.45. The ratio of the first oligomer based on the total oligomers may range from about 0.32 to about 0.43.

A ratio (the content of the second oligomer/the content of the total oligomers) of the second oligomer based on the total oligomers may range from about 0.15 to about 0.45. The ratio of the second oligomer based on the total oligomers may range from about 0.20 to 0.40. The ratio of the second oligomer based on the total oligomers may range from about 0.23 to 0.37. The ratio of the second oligomer based on the total oligomers may range from about 0.25 to 0.36.

A ratio (the content of the third oligomer/the content of the total oligomers) of the third oligomer based on the total oligomers may range from about 0.05 to about 0.25. The ratio of the third oligomer based on the total oligomers may range from about 0.07 to 0.20. The ratio of the third oligomer based on the total oligomers may range from about 0.08 to 0.17. The ratio of the third oligomer based on the total oligomers may range from about 0.09 to 0.16.

A ratio (the content of the fourth oligomer/the content of the total oligomers) of the fourth oligomer based on the total oligomers may range from about 0.05 to about 0.30. The ratio of the fourth oligomer based on the total oligomers may range from about 0.07 to 0.25. The ratio of the fourth oligomer based on the total oligomers may range from about 0.08 to 0.22. The ratio of the fourth oligomer based on the total oligomers may range from about 0.09 to 0.19.

A ratio (the content of the second oligomer/the content of the first oligomer) of the second oligomer based on the first oligomer may range from about 0.5 to about 1.2. The ratio of the second oligomer based on the first oligomer may range from about 0.55 to about 1.0. The ratio of the second oligomer based on the first oligomer may range from about 0.6 to about 0.95. The ratio of the second oligomer based on the first oligomer may range from about 0.7 to about 0.9.

A ratio (the content of the third oligomer/the content of the first oligomer) of the third oligomer based on the first oligomer may range from about 0.2 to about 0.6. The ratio of the third oligomer based on the first oligomer may range from about 0.22 to about 0.50. The ratio of the third oligomer based on the first oligomer may range from about 0.23 to about 0.45. The ratio of the third oligomer based on the first oligomer may range from about 0.25 to about 0.42.

A ratio (the content of the fourth oligomer/the content of the first oligomer) of the fourth oligomer based on the first oligomer may range from about 0.25 to about 0.65. The ratio of the fourth oligomer based on the first oligomer may range from about 0.27 to about 0.55. The ratio of the fourth oligomer based on the first oligomer may range from about 0.30 to about 0.50. The ratio of the fourth oligomer based on the first oligomer may range from about 0.30 to about 0.48.

The second oligomer may be included in the total oligomers in a higher content than the third oligomer.

A ratio (the content of the third oligomer/the content of the second oligomer) of the third oligomer based on the second oligomer may range from about 0.2 to about 0.6. A ratio (the content of the third oligomer/the content of the second oligomer) of the third oligomer based on the second oligomer may range from about 0.24 to about 0.5. A ratio (the content of the third oligomer/the content of the second oligomer) of the third oligomer based on the second oligomer may range from about 0.27 to about 0.45.

The molecular weights and contents of the oligomers may be measured by liquid chromatography mass spectrometry.

First, the biodegradable polyester resin composition according to an embodiment or the biodegradable polyester film according to an embodiment is pulverized and classified to produce a powder having an average particle diameter (D50) of about 50 μm. Next, the powder is immersed in an organic solvent such as acetonitrile at room temperature for about 24 hours. Next, after a supernatant of the organic solvent is sampled, the molecular weight and content of the oligomer may be measured by the liquid chromatography mass spectrometry. In addition, to measure the content of the oligomer, dibutyl phthalate may be used as a standard material and a calibration curve may be obtained.

The oligomer may be a hydrophilic regulator capable of adjusting the hydrophilicity and/or hydrophobicity of the biodegradable polyester resin composition according to an embodiment. Accordingly, the oligomer may appropriately control the hydrolysis degree of the biodegradable resin composition according to an embodiment. The oligomer may be a hydrolysis regulator that appropriately controls the hydrolysis degree of the biodegradable resin composition according to an embodiment.

In addition, the oligomer may appropriately control the biodegradability of the biodegradable resin composition according to an embodiment. The oligomer may be a biodegradation regulator that appropriately controls the biodegradability of the biodegradable resin composition according to an embodiment.

Since the biodegradable resin composition according to an embodiment includes the oligomer within the specified range above, it may have appropriate hydrolysis and appropriate biodegradability. In particular, the biodegradable resin composition according to an embodiment includes the first oligomer, the second oligomer, the third oligomer and the fourth oligomer within the specified range above, it may have appropriate hydrolysis and appropriate biodegradability.

The oligomer may adjust the biodegradability of the biodegradable polyester resin composition according to an embodiment as described above. Accordingly, the biodegradable polyester resin composition according to an embodiment may have appropriate hydrolysis and appropriate biodegradability.

Since the biodegradable polyester resin composition according to an embodiment includes an oligomer having the above-described characteristics, it may have a low initial hydrolysis degree, a high later hydrolysis degree and a high later biodegradability.

Accordingly, the biodegradable polyester resin composition according to an embodiment may be efficiently applied to a film for packaging and the like. That is, a film made of the biodegradable polyester resin composition according to an embodiment may be used for general purposes such as packaging. Here, since the biodegradable polyester resin composition according to an embodiment has a low initial hydrolysis degree, the biodegradable polyester film may maintain mechanical and chemical properties to a certain extent or more within a period of normal use by a user.

In addition, since the biodegradable polyester resin composition according to an embodiment includes an oligomer having the above-described characteristics, it may have a higher hydrolysis degree. Accordingly, a film made of the biodegradable polyester resin composition according to an embodiment may be degraded when discarded after use.

In addition, the biodegradable polyester resin composition according to an embodiment includes an oligomer having the above-described characteristics, decomposition by ambient moisture and decomposition by microorganisms may be complemented each other. Accordingly, the biodegradable polyester resin composition according to an embodiment may have a high biodegradability degree while having a low initial hydrolysis degree.

In addition, since the biodegradable polyester resin composition according to an embodiment includes an oligomer having the above-described characteristics, it may have a biodegradability per aliphatic carboxylic acid of about 1.5 or more. That is, the biodegradable polyester resin composition according to an embodiment has a high biodegradability degree while having a low aliphatic carboxylic acid content. Accordingly, since the biodegradable polyester resin composition according to an embodiment has a relatively high aromatic carboxylic acid content, it may have a high biodegradability in a later period while having a high hydrolysis resistance in an initial period.

The biodegradable polyester resin composition according to an embodiment may maintain mechanical and chemical properties above a certain level during the period of use by a user. At the same time, since the biodegradable polyester resin composition according to an embodiment has a high later hydrolysis degree, it may be degraded in rivers or sea. That is, the biodegradable polyester resin composition according to an embodiment may solve environmental problems such as plastic pollution in the ocean.

The oligomer may appropriately control the hydrolysis degree of the biodegradable polyester resin composition according to an embodiment. The oligomer may be a hydrolysis regulator that appropriately controls the hydrolysis degree of the biodegradable polyester resin composition according to an embodiment.

In addition, the oligomer may appropriately control the biodegradability of the biodegradable polyester resin composition according to an embodiment. The oligomer may be a biodegradation regulator that appropriately controls the biodegradability of the biodegradable polyester resin composition according to an embodiment.

The biodegradable polyester resin composition according to an embodiment may include a heat stabilizer. The heat stabilizer may be a phosphorus-based heat stabilizer.

The heat stabilizer may be at least one selected from the group consisting of an amine-based high-temperature heat stabilizer such as tetraethylenepentamine, triethylphosphonoacetate, phosphoric acid, phosphorous acid, polyphosphric acid, trimethyl phosphate (TMP), triethyl phosphate, trimethyl phosphine, triphenyl phosphine and the like.

In addition, the heat stabilizer may be an antioxidant having an antioxidant function.

The content of the heat stabilizer may range from about 3000 ppm or less based on the total weight of the biodegradable polyester resin. The content of the heat stabilizer may be, for example, 10 ppm to 3,000 ppm, 20 ppm to 2,000 ppm, 20 ppm to 1,500 ppm or 20 ppm to 1,000 ppm based on the total weight of the biodegradable polyester resin. When the content of the heat stabilizer satisfies the range, the deterioration of the polymer due to high temperature during the reaction process may be controlled so that terminal groups of the polymer may be reduced and the color may be improved. In addition, the heat stabilizer may suppress the activation of a titanium-based catalyst, thereby controlling a reaction rate.

The biodegradable polyester resin composition according to an embodiment may include an elongation improver. Examples of the elongation improver include oil such as paraffin oil, naphthenic oil, or aromatic oil, or adipate such as dibutyl adipate, diethylhexyl adipate, dioctyl adipate, or diisopropyl adipate.

The elongation improver may be included in the biodegradable polyester resin composition according to an embodiment in a content ranging from about 0.001 parts by weight to about 1 part by weight based on 100 parts by weight of the biodegradable polyester resin. The elongation improver may be included in a content ranging from about 0.01 parts by weight to about 1 part by weight based on 100 parts by weight of the biodegradable polyester resin in the biodegradable polyester resin composition according to an embodiment.

Since the elongation improver is included within the specified range above, the biodegradable polyester resin composition according to an embodiment may have improved mechanical properties.

The biodegradable polyester resin composition according to an embodiment may include an inorganic filler. The inorganic filler may be at least one selected from the group consisting of calcium sulfate, barium sulfate, talc, talc powder, bentonite, kaolinite, chalk powder, calcium carbonate, graphite, gypsum, electrically conductive carbon black, calcium chloride, iron oxide, aluminum oxide, potassium oxide, dolomite, silicon dioxide, wollastonite, titanium dioxide, silicate, mica, glass fiber, mineral fiber, and the like.

In particle diameter distribution obtained by laser diffraction for the inorganic filler, a cumulative 50% particle size ($D_{50}$) based on volume may range from about 100 μm or less, about 85 μm or less, about 70 μm or less, about 50 μm or less, about 25 μm or less, about 10 μm or less, about 5 μm or less, about 3 μm or less or about 1 μm or less.

In addition, the specific surface area of the inorganic filler may range from about 100 $m^2/g$ or more. For example, the specific surface area of the inorganic filler may range from about 100 $m^2/g$ or more, about 105 $m^2/g$ or more, or about 110 $m^2/g$ or more.

The inorganic filler may be included in the biodegradable polyester resin composition according to an embodiment in a content ranging from about 3 parts by weight to about 50 parts by weight based on 100 parts by weight of the biodegradable polyester resin. The inorganic filler may be included in the biodegradable polyester resin composition according to an embodiment in a content ranging from about 5 parts by weight to about 30 parts by weight based on 100 parts by weight of the biodegradable polyester resin.

The inorganic filler may be included in a content ranging from about 3,000 ppm or less based on the total weight of the biodegradable polyester resin composition according to an embodiment. For example, the content of the inorganic filler may range from about 3,000 ppm or less, about 1,500 ppm or less, about 1,200 ppm or less, about 800 ppm or less or about 600 ppm or less, particularly about 50 ppm or more, about 100 ppm or more, about 130 ppm or more, about 150 ppm or more or about 180 ppm or more based on the total weight of the biodegradable polyester resin composition according to an embodiment.

Since the biodegradable polyester resin composition according to an embodiment includes the inorganic filler within the specified range above, the biodegradable polyester resin composition according to an embodiment may have mechanical properties, appropriate UV resistance, an appropriate biodegradation rate and an appropriate hydrolysis rate.

The biodegradable polyester resin composition according to an embodiment may further include a heterogeneous biodegradable resin. The biodegradable polyester resin composition according to an embodiment may be a composite resin composition including two or more types of resins, a filler and an additive.

The heterogeneous biodegradable resin may be at least one selected from the group consisting of polybutylene azelate terephthalate (PBAzT), polybutylene sebacate terephthalate (PBSeT) and polybutylene succinate terephthalate (PBST), polyhydroxyalkanoate (PHA) or polylactic acid (PLA).

The heterogeneous biodegradable resin may be included in the biodegradable polyester resin composition according to an embodiment in a content ranging from about 10 parts by weight to about 100 parts by weight based on 100 parts by weight of the biodegradable polyester resin. The heterogeneous biodegradable resin may be included in the biodegradable polyester resin composition according to an embodiment in a content ranging from about 10 parts by weight to about 60 parts by weight based on 100 parts by weight of the biodegradable polyester resin. The heterogeneous biodegradable resin may be included in the biodegradable polyester resin composition according to an embodiment in a content ranging from about 20 parts by weight to about 50 parts by weight based on 100 parts by weight of the biodegradable polyester resin.

The heterogeneous biodegradable resin may supplement the mechanical, optical and chemical properties of the biodegradable polyester resin. Since the biodegradable polyester resin composition according to an embodiment includes the heterogeneous biodegradable resin in the content, the biodegradable polyester resin composition according to an embodiment may have mechanical properties, appropriate UV resistance, an appropriate biodegradation rate and an appropriate hydrolysis rate.

In addition, the number of carboxyl terminal groups of the biodegradable polyester resin composition according to an embodiment may range from about 50 eq/ton or less. For example, the number of the carboxyl terminal groups of the biodegradable polyester resin according to an embodiment may range from about 50 eq/ton or less, about 48 eq/ton or less, about eq/ton or less or about 42 eq/ton or less. When the number of the carboxyl terminal groups is adjusted to the above range, deterioration may be prevented and improved mechanical properties may be achieved when the biodegradable polyester resin composition according to an embodiment is extruded to form a molded article.

In addition, the intrinsic viscosity (IV) of the biodegradable polyester resin composition according to an embodiment may range from about 0.9 dl/g or more. The intrinsic viscosity of the biodegradable polyester resin composition according to an embodiment may range from about 0.95 dl/g or more, about 1.0 dl/g or more, about 1.1 dl/g or more, about 1.2 dl/g or more or about 1.3 dl/g or more. The intrinsic viscosity of the biodegradable polyester resin composition according to an embodiment may range from about 0.95 dl/g to about 1.7 dl/g. The intrinsic viscosity of the biodegradable polyester resin composition according to an embodiment may range from about 1.3 dl/g to about 1.7 dl/g. The intrinsic viscosity of the biodegradable polyester resin composition according to an embodiment may range from about 1.4 dl/g to about 1.7 dl/g.

A process of preparing the biodegradable polyester resin composition according to an embodiment is as follows.

Referring to FIG. 1, an apparatus for producing the biodegradable polyester resin includes a slurry stirrer 100, an esterification part 200, a polycondensation reaction part 300, a post-treatment part 400, a first recovery part 510 and a second recovery part 520.

A method of preparing the biodegradable polyester resin includes an operation of preparing a slurry including the diol and the aromatic dicarboxylic acid.

The operation of preparing a slurry includes an operation of mixing and processing the diol and the aromatic dicarboxylic acid. That is, the operation of preparing a slurry is a pretreatment before an esterification and may be an operation of mixing the diol and the aromatic dicarboxylic acid and slurrying the mixture. Here, the diol may include a biomass-based diol component.

The temperature of the slurry of the diol and the aromatic dicarboxylic acid may range from about 5° C. to about 15° C. higher than the melting point of the diol. For example, when the diol is 1,4-butanediol, the temperature of the slurry may range from about 35° C. to about 45° C.

The diol and the aromatic dicarboxylic acid are fed into and stirred in the slurry stirrer 100, thereby preparing the slurry.

By mixing, pre-treating, and slurrying the diol and the aromatic dicarboxylic acid, the diol and the aromatic dicarboxylic acid may be uniformly reacted and the speed of an esterification may be effectively accelerated, thereby increasing reaction efficiency.

In particular, when an aromatic dicarboxylic acid, such as terephthalic acid, has complete crystallinity and is in powder form, it may be difficult to cause a homogeneous reaction due to very low solubility in the diol. Therefore, the slurrying pretreatment process may play a very important role in providing a biodegradable polyester resin, sheet, film and molded article having improved properties according to an embodiment of the present disclosure and improving reaction efficiency.

When the aromatic dicarboxylic acid is terephthalic acid, the terephthalic acid is a white crystal that has complete crystallinity and sublimes at around 300° C. under atmospheric pressure without a melting point. In addition, the terephthalic acid has very low solubility in the diol, making it difficult for a homogeneous reaction to occur. Accordingly, when a pretreatment process is performed before an esterification, a uniform reaction may be induced by increasing the surface area for reacting with a diol in a solid matrix of terephthalic acid.

In addition, when the aromatic dicarboxylic acid is dimethyl terephthalate, the dimethyl terephthalate may be made into a molten state at about 142° C. to 170° C. by the pretreatment process and reacted with the diol, so that an esterification can be proceeded faster and more efficiently.

Meanwhile, in the pretreatment step of preparing the slurry, the structure and properties of the biodegradable polyester resin may vary depending on the particle size, particle size distribution, pretreatment reaction conditions, and the like of the aromatic dicarboxylic acid.

For example, the aromatic dicarboxylic acid may include terephthalic acid, and the terephthalic acid may have an average particle diameter (D50) of 10 μm to 400 μm measured by a particle size analyzer Microtrac S3500 in a particle size distribution (PSD), and a standard deviation of the average particle diameter (D50) may be 100 or less. The standard deviation means the square root of the variance. The average particle diameter (D50) of the terephthalic acid may be for example 20 μm to 200 μm, for example 30 μm to 180 μm, or for example 100 μm to 160 μm. When the average particle diameter (D50) of the terephthalic acid satisfies the range, it may be more advantageous in terms of the solubility improvement of the diol and the reaction rate.

In the pretreatment process, the diol and the aromatic dicarboxylic acid may be mixed and fed into the slurry stirrer 100 (tank).

The slurry stirrer 100 may be provided with, for example, an anchor-type bottom, a height to the agitator of 20 mm or more, and two or more rotary blades, which may be more advantageous to achieve an efficient stirring effect.

For example, the slurry stirrer 100 has a height of 20 mm or more from the agitator, i.e., the reactor and the bottom of the agitator may be almost attached to each other. In this case, a slurry may be obtained without precipitation. If the shape and rotary blades of the agitator do not satisfy the conditions, the aromatic dicarboxylic acid may precipitate to the bottom when the diol and the aromatic dicarboxylic acid are initially mixed. In this case, phase separation may occur.

The pretreatment step of preparing the slurry may include a step of mixing the diol and the aromatic dicarboxylic acid and stirring the mixture about 50 rpm to about 200 rpm at about 30° C. to about 100° C. for 10 minutes or more, for example 10 minutes to 200 minutes.

The diol may have characteristics as described above.

The diol may be added at one time or intermittently. For example, the diol may be added intermittently when mixing with an aromatic dicarboxylic acid and when mixing with an aliphatic dicarboxylic acid.

The aromatic dicarboxylic acid may have characteristics as described above.

In the pretreatment of preparing the slurry, a molar ratio of the diol to the aromatic dicarboxylic acid may range from about 0.8:1 to about 2:1. In the pretreatment of preparing the slurry, a molar ratio of the diol to the aromatic dicarboxylic acid may range from about 1.1:1 to about 1.5:1. In the pretreatment of preparing the slurry, a molar ratio of the diol to the aromatic dicarboxylic acid may range from about 1.2:1 to about 1.5:1.

When the diol is added in a larger amount than the aromatic dicarboxylic acid, the aromatic dicarboxylic acid may be dispersed.

In addition, an additive may be added to the slurry. The nanocellulose and/or the metal salt may be added in the form of a dispersion or solution to the slurry.

In the method of preparing the biodegradable polyester resin, a prepolymer is obtained by esterification using a slurry obtained by mixing and pretreating a diol and an aromatic dicarboxylic acid, and the prepolymer is condensation-polymerized, so that the desired structure and physical properties of the biodegradable polyester resin according to the embodiment of the present disclosure may be efficiently achieved.

The method of preparing the biodegradable polyester resin includes a step of esterifying the slurry and the aliphatic dicarboxylic acid to prepare a prepolymer. The slurry and the aliphatic dicarboxylic acid may be reacted in the ester reaction part.

In the esterification, the reaction time may be shortened by using the slurry. For example, a slurry obtained from the pretreatment operation may shorten the reaction time of the esterification by 1.5 times or more.

The esterification may be performed at least twice. A prepolymer to be added to a condensation polymerization process may be formed by the esterification.

In an embodiment, the esterification may be performed at once after adding an aliphatic dicarboxylic acid, or a diol and an aliphatic dicarboxylic acid to the slurry. That is, the esterification may proceed when the slurry is fed into the esterification part 200 and the aliphatic dicarboxylic acid alone or the aliphatic dicarboxylic acid and the diol are fed into the esterification part 200.

The diol and the aliphatic dicarboxylic acid may be added in the form of a slurry to a slurry including the aromatic dicarboxylic acid.

In the slurry of the diol and the aliphatic dicarboxylic acid, the average particle diameter (D50) of the aliphatic dicarboxylic acid may range from about 50 μm to about 150 μm.

In the slurry of the diol and the aliphatic dicarboxylic acid, the average particle diameter (D50) of the aliphatic dicarboxylic acid may range from about 60 μm to about 120 μm.

In the esterification, the total number of moles of the diols introduced may range from about 1.0 to about 1.8 relative to the total number of moles of the aromatic dicarboxylic acid and the aliphatic dicarboxylic acid. In the esterification, the total number of moles of the diols introduced may range from about 1.1 to about 1.6 relative to the total number of moles of the aromatic dicarboxylic acid and the aliphatic dicarboxylic acid.

In addition, the temperature of the slurry of the diol and the aliphatic dicarboxylic acid may range from about 5° C. to about 15° C. higher than the melting point of the diol.

In addition, various additives such as the nanocellulose may also be added to the slurry of the diol and the aliphatic dicarboxylic acid.

The esterification may be performed at about 250° C. or less for about 0.5 hours to about 6 hours. Specifically, the esterification may be performed at about 180° C. to about 250° C., about 185° C. to about 240° C. or about 200° C. to about 240° C. under normal pressure or reduced pressure until the theoretical amount of water as a by-product reaches 95%. For example, the esterification may be performed for 0.5 hours to 5.5 hours, 0.5 hours to 4.5 hours or 1 hour to 4 hours, but is not limited thereto.

In the esterification, the total number of moles of the diols introduced may be 1.0 to about 1.8 relative to the total number of moles of the aromatic dicarboxylic acid and the aliphatic dicarboxylic acid about. In the esterification, the total number of moles of the diols introduced may range from about 1.1 to about 1.6 relative to the total number of moles of the aromatic dicarboxylic acid and the aliphatic dicarboxylic acid.

In addition, the temperature of the slurry of the diol and the aliphatic dicarboxylic acid may range from about 5° C. to about 15° C. higher than the melting point of the diol.

In addition, various additives such as the nanocellulose may also be added to the slurry of the diol and the aliphatic dicarboxylic acid.

In an embodiment, first esterification may proceed with the slurry itself or after adding the diol to the slurry. In addition, after the first esterification, the aliphatic dicarboxylic acid or a mixture of the aliphatic dicarboxylic acid and the diol may be fed into the ester reaction part, and second esterification may proceed together with the first esterification product.

The first esterification may be performed at 250° C. or less for 0.25 hours to 4 hours. Specifically, the first esterification may be performed at 180° C. to 250° C., 185° C. to 240° C. or 200° C. to 240° C. under normal pressure or reduced pressure until the theoretical amount of water as a by-product reaches 95%. For example, the first esterification may be performed for 0.25 hours to 4 hours, 0.25 hours to 3.5 hours or 1.5 hours to 3 hours, but is not limited thereto.

The second esterification may be performed at about 250° C. or less for 0.25 hours to 3.5 hours. Specifically, the second esterification may be performed at 180° C. to 250° C., 185° C. to 240° C. or 200° C. to 240° C. under normal pressure or reduced pressure until the theoretical amount of water as a by-product reaches 95%. For example, the second esterification may be performed for 0.5 hours to 3 hours, 1 hour to 2.5 hours or 1.5 hours to 3 hours, but is not limited thereto.

In the first esterification and the second esterification, a ratio of the number of the first blocks to the number of the second blocks and the like may be controlled by respectively adjusting the reaction temperature and the reaction time. In addition, the esterification is divided into the first esterification and the second esterification, the entire esterification may be precisely controlled. Accordingly, when the esterification is divisionally performed, the reaction stability and reaction uniformity of the esterification may be improved.

After the second esterification is completed, third esterification may be performed. Here, a monomer composition including at least one of the diol, the aromatic dicarboxylic acid and the aliphatic dicarboxylic acid may be added to the second esterification product, and the third esterification may be performed.

The monomer composition may be added in a content ranging from about 0.5 parts by weight to about 5 parts by weight based on 100 parts by weight of the second esterification product to the second esterification product.

In addition, in the monomer composition, a molar ratio of the aromatic dicarboxylic acid to the aliphatic dicarboxylic acid may range from about 1:1 to about 1:3. In the monomer composition, a molar ratio of the aromatic dicarboxylic acid to the aliphatic dicarboxylic acid may range from about 1:1.3 to about 1:3.

In addition, in the monomer composition, a molar ratio of the diol to all the dicarboxylic acids may range from about 0.8:1 to 1:1.2.

The third esterification may be performed at about 250° C. or less for 0.1 hours to 0.5 hours. Specifically, the third esterification may be performed at 180° C. to 250° C., 185° C. to 240° C. or 200° C. to 240° C. under normal pressure or reduced pressure. For example, the third esterification may be performed for 5 minutes to 40 minutes, 10 minutes to 30 minutes or 10 minutes to 20 minutes, but is not limited thereto.

A prepolymer may be formed by the third esterification.

When using the monomer composition and performing the third esterification under the above-described conditions, the content of the oligomer may be appropriately controlled.

Alternatively, the oligomer may be separately prepared and added to the second esterification product to produce the prepolymer.

In the third esterification, the second esterification product may not be used. That is, the third esterification may be performed by the monomer composition and other additives such as a catalyst. Next, the second esterification product and the third esterification product are mixed to produce the prepolymer. Here, the third esterification product is mixed with the second esterification product in a content ranging from about 0.1 parts by weight to about 5 parts by weight based on 100 parts by weight of the second esterification product, thereby producing the prepolymer.

The number average molecular weight of the prepolymer may range from about 500 to about 10000 g/mol. For example, the number average molecular weight of the prepolymer may range from about 500 to about 8500 g/mol, about 500 to about 8000 g/mol, about 500 to about 7000 g/mol, about 500 g/mol to about 5000 g/mol, or about 800 g/mol to about 4000 g/mol. When the number average molecular weight of the prepolymer satisfies the range, the molecular weight of a polymer in a polycondensation reaction may be efficiently increased.

The number average molecular weight may be measured using gel permeation chromatography (GPC). Specifically, data obtained by gel permeation chromatography includes various items such as Mn, Mw and Mp. Thereamong, the molecular weight may be measured based on the number average molecular weight (Mn).

The reinforcing material, the branching agent, the polycarbonate diol, the polyether polyol or the metal salt may be added together with the slurry before the esterification. The reinforcing material, the branching agent, the polycarbonate diol, the polyether polyol and/or the metal salt may be fed into an esterification part 200 in the middle of the esterification. The reinforcing material, the branching agent, the polycarbonate diol, the polyether polyol and/or the metal salt may be added to the esterification product after the esterification. In addition, the reinforcing material, the branching agent, the polycarbonate diol, the polyether polyol and/or the metal salt may be added together with the aliphatic dicarboxylic acid. In addition, the reinforcing material, the branching agent, the polycarbonate diol, the polyether polyol and/or the metal salt may be fed into the esterification part 200 after the first esterification and before the second esterification.

Since the reinforcing material and/or the metal salt is added during the esterification, the reinforcing material and/or the metal salt may be uniformly dispersed in the biodegradable polyester resin.

The reinforcing material may have the above-described characteristics. In particular, the nanocellulose may be used as the reinforcing material.

The nanocellulose may be pre-treated by a bead mill, pre-treated by ultrasonic waves, or pre-treated by high-speed dispersion at about 1000 rpm to about 1500 rpm before being introduced. Specifically, the nano-cellulose may be water-dispersed nano-cellulose pre-treated with a bead mill or pre-treated with ultrasonic waves.

First, the bead mill pretreatment may be performed with a vertical mill or horizontal mill as a wet milling device. With the horizontal mill, the amount of beads that can be filled into a chamber is greater, the uneven wear of the machine is reduced, the wear of the beads is reduced, and maintenance is easier.

The bead mill pretreatment may be performed using one or more bead types selected from the group consisting of zirconium, zircon, zirconia, quartz and aluminum oxide.

Specifically, the bead mill pretreatment may be performed using beads having a diameter of about 0.3 mm to about 1 mm. For example, the diameter of the beads may range from about 0.3 mm to about 0.9 mm, about 0.4 mm to about 0.8 mm, about 0.45 mm to about 0.7 mm or about 0.45 mm to about 0.6 mm.

When the diameter of the beads satisfies the range, the dispersibility of nanocellulose may be further improved. When the diameter of the beads exceeds the range, the average particle diameter and average particle deviation of nanocellulose increase, resulting in low dispersibility.

In addition, in the bead mill pretreatment, beads with a higher specific gravity than that of nanocellulose may be used. For example, the beads may be one or more selected from the group consisting of zirconium, zircon, zirconia, quartz and aluminum oxide which have a higher specific gravity than water-dispersed nanocellulose, and zirconium beads having a specific gravity four times or higher than the water-dispersed nanocellulose are preferred, without being not limited thereto.

In addition, the ultrasonic pretreatment is a method of physically closing or pulverizing nanoparticles with waves generated by emitting 20 kHz ultrasound into a solution.

The ultrasonic pretreatment may be performed for less than 30 minutes at an output of 30000 J/s or less. For example, the ultrasonic pretreatment may be performed at an output of 25000 J/s or less or 22000 J/s or less for 25 minutes or less, 20 minutes or less or 18 minutes or less. When the output and the execution time satisfy the above ranges, the effect, i.e., the improvement of dispersibility, of the ultrasonic pretreatment may be maximized. When the output exceeds the above range, the nanoparticles may rather re-agglomerate and the dispersibility may be lowered.

The nanocellulose according to an embodiment may be pre-treated with a bead mill or pre-treated with ultrasonic waves. Alternatively, the nanocellulose according to an embodiment may be pre-treated with a bead mill and pre-treated with ultrasonic waves. Here, it is preferred to perform ultrasonic pretreatment after pre-treating with a bead mill in terms of improving dispersibility by preventing re-agglomeration.

The nanocellulose according to an embodiment may be pre-treated with a bead mill or pre-treated with ultrasonic waves. Alternatively, the nanocellulose according to an embodiment may be pre-treated with a bead mill and pre-treated with ultrasonic waves. Here, it is preferred to perform ultrasonic pretreatment after pretreatment with a bead mill in terms of improving dispersibility by preventing reagglomeration.

Since the nanocellulose includes an ion-bonded metal, it has very high dispersibility in water. In addition, an aqueous dispersion having a very high dispersion of the nanocellulose may be obtained by the bead mill pretreatment and/or the ultrasonic pretreatment. In the aqueous nanocellulose dispersion, the content of the nanocellulose may range from about 1 wt % to about 50 wt %.

In the esterification, a titanium-based catalyst and/or a germanium-based catalyst may be used. Specifically, the titanium-based catalyst and/or the germanium-based catalyst may be added to the slurry, and the esterification may be performed.

In addition, the titanium-based catalyst and/or the germanium-based catalyst may be added to the slurry before the first esterification, and the titanium-based catalyst and/or the germanium-based catalyst may be further added to the product of the first esterification.

The biodegradable polyester resin may include one or more titanium-based catalysts selected from the group consisting of titanium isopropoxide, antimony trioxide, dibutyltin oxide, tetrapropyl titanate, tetrabutyl titanate, tetraisopropyl titanate, antimonia acetate, calcium acetate and magnesium acetate, or one or more germanium-based catalysts selected from the group consisting of germanium oxide, germanium methoxide, germanium ethoxide, tetramethyl germanium, tetraethyl germanium and germanium sulfide.

In addition, the content of the catalyst may range from about 50 ppm to 2000 ppm based on a total weight of a diol, an aromatic dicarboxylic acid, and an aliphatic dicarboxylic acid. For example, about 60 ppm to about 1600 ppm, about 70 ppm to about 1400 ppm, about 80 ppm to about 1200 ppm or about 100 ppm to about 1100 ppm of titanium-based catalyst or germanium-based catalyst may be included. When the content of the catalyst satisfies the range, the physical properties may be further improved.

In addition, the heat stabilizer may be added together with the slurry before the esterification. The heat stabilizer may be fed into the esterification part 200 in the middle of the esterification. The heat stabilizer may be added to the esterification product after the esterification. In addition, the heat stabilizer may be added together with the aliphatic dicarboxylic acid. In addition, the heat stabilizer may be fed into the esterification part 200 after the first esterification and before the second esterification.

The characteristics of the heat stabilizer may be as described above.

The content of the heat stabilizer may be 3,000 ppm or less based on a total weight of a diol, an aromatic dicarboxylic acid, and an aliphatic dicarboxylic acid. Specifically, the content of the heat stabilizer may be, for example, 10 ppm to 3,000 ppm, 20 ppm to 2,000 ppm, ppm to 1,500 ppm or 20 ppm to 1,000 ppm based on a total weight of a diol, an aromatic dicarboxylic acid, and an aliphatic dicarboxylic acid. When the content of the heat stabilizer satisfies the range, the deterioration of the polymer due to high temperature during the reaction process may be controlled, the terminal groups of the polymer may be reduced and the color may be improved.

After completion of the esterification, one or more selected from the group consisting of an additive such as silica, potassium or magnesium and a color-correcting agent such as cobalt acetate may be further added to the esterification product. That is, after completion of the esterification, the additive and/or the color-correcting agent may be added and stabilized, and then a polycondensation reaction may be performed. The additive and/or the color-correcting agent may be added after completion of the esterification, and may be fed into the polycondensation reaction part 300 together with the prepolymer. Accordingly, the additive and/or the color-correcting agent may be uniformly dispersed in the biodegradable polyester resin.

In addition, after completion of the esterification, the inorganic filler may be added to the esterification product. That is, the inorganic filler is added and stabilized after completion of the esterification, and then the polycondensation reaction may be performed. The characteristics of the inorganic filler are as described above. The inorganic filler may be fed into the polycondensation reaction part 300 together with the prepolymer, and the condensation polymerization process may be performed. Accordingly, the inorganic filler may be uniformly dispersed in the biodegradable polyester resin.

In addition, the first recovery part 510 recovers by-products such as water from the esterification part 200. The first recovery part 510 may recover by-products generated from the esterification by applying vacuum pressure to the esterification part 200 or proceeding with reflux.

The method of preparing the biodegradable polyester resin includes a step of polycondensing the prepolymer. The polycondensation reaction may be performed as follows.

The prepolymer is fed into the polycondensation reaction part 300. In addition, at least one of the reinforcing material, the heat stabilizer, the color-correcting agent, the inorganic filler, the metal salt and other additives may be fed into the polycondensation reaction part 300 together with the prepolymer.

In addition, the prepolymer and the oligomer composition may be added to the polycondensation reaction part, and a polycondensation reaction of the prepolymer and the oligomer may be performed.

The oligomer composition may be prepared by the following method.

The oligomer composition may be prepared by esterification of the diol, the aromatic dicarboxylic acid and the aliphatic dicarboxylic acid. Here, the oligomer composition may be prepared to include an oligomer having a molecular weight of 400 to 1300 as a main component.

The temperature of the esterification for preparing the oligomer composition may range from about 200° C. to about 250° C. In addition, the esterification time for preparing the oligomer composition may range from about 5 minutes to about 20 minutes.

In addition, the content of the oligomer composition added to the polycondensation reaction may range from about 0.5 wt % to about 10 wt % based on the total weight of the materials added to the polycondensation reaction. The content of the oligomer composition added to the polycondensation reaction may range from about 1 wt % to about 7 wt % based on the total weight of the materials added to the polycondensation reaction.

Since the characteristics and content of the oligomer composition are as described above, the biodegradable polyester resin composition according to an embodiment may include the oligomer having a molecular weight of 400 to 1300 in an appropriate content.

Next, the polycondensation reaction may be performed at about 180° C. to about 280° C. and about 10 Torr or less for about 1 hour to about 5 hours. For example, the polycondensation reaction may be performed at about 190° C. to about 270° C., about 210° C. to about 260° C. or about 230° C. to about 255° C., may be performed at about 0.9 Torr or less, about 0.7 Torr or less, about 0.2 Torr to about 10 Torr, about 0.2 Torr to about 0.9 Torr or about 0.2 Torr to about 0.6 Torr, and may be performed for about 1.5 hours to about 5 hours, about 2 hours to about 5 hours or about 2.5 hours to about 4.5 hours.

In addition, the polycondensation reaction may include first polycondensation and second polycondensation.

For example, the first polycondensation may be performed at about 260° C. or less, about 250° C. or less, about 215° C. to about 250° C., about 215° C. to about 245° C. or about 230° C. to about 245° C. under about 1 torr to about 200 torr, about 2 Torr to about 100 torr, about 4 Torr to about 50 torr, about 5 Torr to about 45 Torr or about 8 Torr to about 32 Torr for about 0.5 hours to about 3.5 hours, about 0.5 hours to about 3.0 hours or about 0.5 hours to about 2.8 hours.

In addition, the second polycondensation may be performed at about 220° C. to about 265° C., about 230° C. to about 260° C. or about 235° C. to about 255° C. under about 1 torr or less, about 0.8 Torr or less, about 0.6 Torr or less, about 0.1 Torr to about 1 torr, about 0.2 Torr to about 0.8 Torr or about 0.2 Torr to about 0.6 Torr for about 0.5 hours to about 4 hours, about 1 hour to about 3.5 hours or about 1.5 hours to about 3.5 hours.

In addition, before the polycondensation reaction, a titanium-based catalyst or a germanium-based catalyst may be further added to the prepolymer. In addition, before the polycondensation reaction, one or more selected from the group consisting of an additive such as silica, potassium or magnesium; an amine-based stabilizer such as trimethyl phosphate, triphenyl phosphate, trimethyl phosphine, phosphoric acid, phosphorous acid, or tetraethylenepentamine; and a polymerization catalyst such as antimony trioxide, antimony trioxide or tetrabutyl titanate may be further added to the prepolymer.

The number average molecular weight of the polymer may range from about 30000 g/mol or more. For example, the number average molecular weight of the polymer may range from about 33000 g/mol or more, about 35000 g/mol or more or about 40000 g/mol to about 90000 g/mol. When the number average molecular weight of the polymer satisfies the range, physical properties, impact resistance, durability and moldability may be further improved.

In addition, the second recovery part 520 recovers by-products such as water from the polycondensation reaction part 300. The second recovery part 520 may apply vacuum pressure to the polycondensation reaction part 300, and may recover by-products generated in the polycondensation reaction.

The second recovery part 520 may apply a vacuum pressure of about 0.1 Torr to about 1 torr to the inside of the polycondensation reaction part 300. The second recovery part 520 may apply a vacuum pressure of about 0.1 Torr to about 0.9 Torr to the inside of the polycondensation reaction part 300.

Next, the anti-hydrolysis agent and/or the chain extender are added to the polymer. Next, the polymer, the anti-hydrolysis agent and the chain extender are uniformly mixed and allowed to stand at about 200° C. to about 260° C. for about 1 minute to about 15 minutes. Accordingly, the polymer reacts with the anti-hydrolysis agent and/or the chain extender.

Alternatively, the anti-hydrolysis agent and/or the chain extender may be fed into the polycondensation reaction part 300 through a static mixer and reacted with the polymer. A reaction temperature of the anti-hydrolysis agent and/or the chain extender in the polycondensation reaction part 300 may range from about 200° C. to about 260° C. In addition, a reaction time of the anti-hydrolysis agent and/or the chain extender in the polycondensation reaction part 300 may range from about 1 minute to about 15 minutes.

The anti-hydrolysis agent may have the characteristics described above.

The chain extender may have the characteristics described above.

Accordingly, the biodegradable polyester resin composition according to an embodiment may have appropriate hydrolysis and a high biodegradability degree.

Next, a pellet may be produced from the polymer.

Specifically, the pellet may be produced by cooling the polymer to about 15° C. or less, about 10° C. or less or about 6° C. or less, and then cutting the cooled polymer. Alternatively, the polymer may be cut at about 40° C. to about 60° C.

The cutting may be performed using any pellet cutting machine used in the art without limitation, and the pellet may have various shapes. The pellet cutting method may include an underwater cutting method or a strand cutting method.

The pellet may be subjected to an additional post-treatment process. The pellet may be fed into the post-treatment part 400, and the post-treatment process may be performed.

The post-treatment process may be performed in the post-treatment part 400. The pellet is fed into the post-treatment part 400. Next, the post-treatment part 400 may melt and re-extrude the fed pellet by frictional heat. That is, the post-treatment part 400 may include an extruder such as a twin-screw extruder.

The temperature of the post-treatment process may range from about 230° C. to about 270° C. The temperature of the post-treatment process may range from about 230° C. to about 260° C. The temperature of the post-treatment process may range from about 240° C. to about 265° C. The temperature of the post-treatment process may range from about 240° C. to about 260° C.

The post-treatment process time may range from about 30 seconds to about 3 minutes. The post-treatment process time may range from about 50 seconds to about 2 minutes. The post-treatment process time may range from about 1 minute to about 2 minutes.

Next, A resin extruded by the extruder may be cooled, cut, and processed into post-treated pellets. That is, the resin extruded from the extruder may be reprocessed into a pellet through the cutting step described above.

Crystallinity of the pellet may be improved in the post-treatment process. In addition, the content of the residue included in the pellet may be adjusted in the post-treatment process. In particular, the content of an oligomer contained in the pellet may be controlled by the post-treatment process. The amount of residual solvent contained in the pellet may be controlled by the post-treatment process.

Accordingly, the post-treatment process may appropriately control the mechanical properties, biodegradability, UV resistance, optical properties, or hydrolysis resistance of the biodegradable polyester resin.

The characteristics and content of the oligomer may depend upon the esterification, the chain extension reaction, the post-treatment process, and the like.

After the pellet is produced, the biodegradable polyester resin may be compounded with the heterogeneous biodegradable resin. In addition, at least one of the inorganic filler, the light stabilizer, the color-correcting agent and the other additives may be compounded with the biodegradable polyester resin and the heterogeneous biodegradable resin.

The compounding process may be as follows.

The biodegradable polyester resin and the heterogeneous biodegradable resin are mixed with at least one of the inorganic filler, the heat stabilizer, the color-correcting agent, the metal salt or the other additives and fed into an extruder. The mixed biodegradable polyester resin composition is melted and mixed at about 120° C. to about 260° C. in the extruder. Next, the melt-mixed biodegradable polyester resin composition is extruded, cooled, cut, and re-pelletized. By this process, the biodegradable polyester resin composition according to an embodiment may be prepared by combining it with the heterogeneous biodegradable resin.

Alternatively, the inorganic filler, the heat stabilizer, the color-correcting agent, the metal salt and the other additives may be added in the middle of the process of polymerizing the biodegradable polyester resin.

By the biodegradable polyester resin according to an embodiment, a biodegradable polyester film may be prepared.

The thickness of the biodegradable polyester film may range from about 5 μm to about 300 μm. For example, the thickness of the biodegradable polyester film may range from about 5 μm to about 180 μm, about 5 μm to about 160 μm, about 10 μm to about 150 μm, about 15 μm to about 130 μm, about 20 μm to about 100 μm, about 25 μm to about 80 μm or about 25 μm to about 60 μm.

The biodegradable polyester film according to an embodiment may have substantially the same hydrolysis degree and biodegradability as the biodegradable polyester resin composition described above.

Meanwhile, the biodegradable polyester film may be prepared using the biodegradable polyester resin or a biodegradable polyester resin pellet.

Specifically, the method of preparing the biodegradable polyester film may include an operation of preparing a biodegradable resin composition according to an example and an operation of drying and melt extruding the biodegradable resin composition.

In the operation of drying and melt extruding the biodegradable resin composition, the drying may be performed at about 60° C. to about 100° C. for about 2 hours to about 12 hours. Specifically, the drying may be performed at about 65° C. to about 95° C., about 70° C. to about 90° C. or about 75° C. to about 85° C. for about 3 hours to about 12 hours or about 4 hours to about 10 hours. When the drying conditions of the pellet satisfy the ranges, the quality of a produced biodegradable polyester film or molded article may be further improved.

In the drying and melt extruding operation, the melt extruding may be performed at about 270° C. or less. For example, the melt extruding may be performed at about 265° C. or less, about 260° C. or less, about 255° C. or less, about 150° C. to about 270° C., about 150° C. to about 255° C. or about 150° C. to about 240° C. The melt extruding may be performed by a blown film process. The melt extruding may proceed in a T-die.

In addition, the film preparation process may be a calendering process.

Biodegradable Polyester Molded Article

A biodegradable polyester molded article may be manufactured using the biodegradable polyester resin.

Specifically, the molded article may be manufactured by molding the biodegradable polyester resin composition in a method, such as extrusion or injection, known in the art, and the molded article may be an injection-molded article, an extrusion-molded article, a thin-film molded product, a blow molding or blow-molded article, 3D filament, an interior material for construction, or the like, but is not limited thereto.

Figure 2:
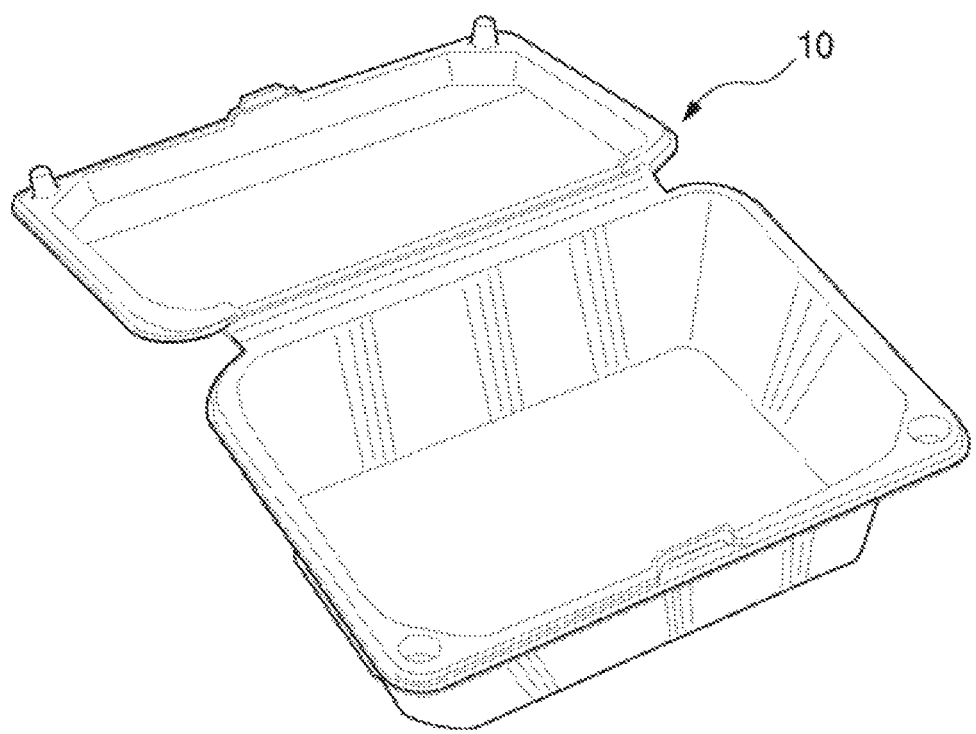
FIG. 2 illustrates an embodiment of a biodegradable molded article formed of a polyester resin composition according to an embodiment.

For example, the molded article may be in the form of a film or sheet that can be used as an agricultural mulching film, disposable gloves, a disposable film, a disposable bag, a food packaging material, a volume-rate garbage bag, etc., and may be in the form of a fiber that can be used as woven, knitted, non-woven, or a rope. In addition, as shown in FIG. 2, the molded article may be in the form of a disposable container that can be used as a container for packaging food such as a lunch box. In addition, the molded article may be a molded article in various forms such as a disposable straw, a cutlery (spoon), a food plate, or a fork.

In particular, since the molded article may be formed from the biodegradable polyester resin capable of improving physical properties such as shock absorption energy and hardness, in particular, impact resistance and durability, it may exhibit improved properties when applied to packaging materials for products stored and transported at low temperatures, interior materials for automobiles requiring durability, garbage bags, mulching films, and disposable products.

The physical properties of the biodegradable film and the biodegradable molded article may be measured in a manner similar to those of the biodegradable polyester resin composition according to an embodiment.

The biodegradability of the biodegradable polyester resin composition according to an embodiment may be measured by the following method.

To measure the biodegradability, the biodegradable polyester resin composition according to an embodiment was mixed with compost, and a biodegradation acceleration test was conducted at 60° C. and a relative humidity 90%. After a certain period, the number average molecular weight of the biodegradable polyester resin composition according to an embodiment was measured using gel permeation chromatography (GPC). A biodegradability was derived by dividing a difference between an initial number average molecular weight and a number average molecular weight after biodegradation for a certain period by the initial number average molecular weight.

The biodegradability may be represented by Equation 1 below:

$$\text{Biodegradability (\%)} = \frac{\text{Initial number average molecular weight} - \text{number average molecular weight after biodegradation}}{\text{Initial number average molecular weight}} \times 100 \quad [\text{Equation 1}]$$

Here, the biodegradable polyester resin composition according to an embodiment is mixed with compost and subjected to a biodegradation acceleration test at 60° C. and a relative humidity of 90% for a certain period. An initial number average molecular weight of the biodegradable polyester resin composition before performing the biodegradability acceleration test and a number average molecular weight after biodegradation of the biodegradable polyester resin composition subjected to the biodegradation acceleration test for a certain period are measured by gel permeation chromatography (GPC).

The biodegradability was derived by dividing a difference between the initial number average molecular weight and the number average molecular weight after biodegradation for a certain period by an initial number average molecular weight.

In addition, the compost may include about 40 wt % of pig manure, about 15 wt % of chicken manure, about 37 wt % of sawdust, about 5 wt % of zeolite and about 3 wt % of a microbial agent.

In addition, the compost may be Jisaengto (by-product fertilizer grade 1 compost) manufactured by Taeheung F&G.

In addition, when measuring the biodegradability, the biodegradable polyester resin composition according to an embodiment is manufactured as a sheet having a thickness of about 300 μm. Next, the manufactured sheet is cut into a size of about 30 mm×30 mm to produce flakes. The flakes are mixed with the compost, and the biodegradation acceleration test is performed.

In the biodegradable polyester resin composition according to an embodiment, a biodegradability after one week may range from about 40% to about 70%. In the biodegradable polyester resin composition according to an embodiment, the biodegradability after one week may range from about 45% to about 65%. In the biodegradable polyester resin composition according to an embodiment, the biodegradability after one week may range from about 47% to about 63%. In the biodegradable polyester resin composition according to an embodiment, the biodegradability after one week may range from about 49% to about 62%.

In the biodegradable polyester resin composition according to an embodiment, the biodegradability after two weeks may range from about 50% to about 70%. In the biodegradable polyester resin composition according to an embodiment, the biodegradability after two weeks may range from about 55% to about 68%.

In the biodegradable polyester resin composition according to an embodiment, a biodegradability after three weeks may range from about 63% to about 75%. In the biodegradable polyester resin composition according to an embodiment, the biodegradability after three weeks may range from about 63% to about 73%.

In the biodegradable polyester resin composition according to an embodiment, a biodegradability after four weeks may range from about 73% to about 85%. In the biodegradable polyester resin composition according to an embodiment, the biodegradability after four weeks may be 75% to 82%.

In the biodegradable polyester resin composition according to an embodiment, a biodegradability after six weeks may range from about 80% to about 90%. In the biodegradable polyester resin composition according to an embodiment, the biodegradability after six weeks may range from about 82% to about 88%.

In the biodegradable polyester resin composition according to an embodiment, a biodegradability after nine weeks may range from about 85% or more. In the biodegradable polyester resin composition according to an embodiment, the biodegradability after nine weeks may range from about 87% or more. In the biodegradable polyester resin composition according to an embodiment, the biodegradability after nine weeks may range from about 88% or more. In the biodegradable polyester resin composition according to an embodiment, the biodegradability after nine weeks may range from about 89% or more. In the biodegradable polyester resin composition according to an embodiment, the biodegradability after nine weeks may range from about 90% or more.

In the biodegradable polyester resin composition according to an embodiment, a biodegradability increase rate from one week to two weeks may range from about 4%/week to about 15%/week. In the biodegradable polyester resin composition according to an embodiment, the biodegradability increase rate from one week to two weeks may range from about 5%/week to about 13%/week.

The hydrolysis degree of the biodegradable polyester resin composition according to an embodiment may be measured by the following method.

To measure the hydrolysis degree, the biodegradable resin composition according to an embodiment is immersed in 80° C. water (100% RH), and a hydrolysis acceleration test is performed. After a certain period, the number average molecular weight of the biodegradable polyester resin composition according to an embodiment was measured using gel permeation chromatography (GPC). A hydrolysis degree was derived by dividing a difference between an initial number average molecular weight and a number average molecular weight after hydrolysis for a certain period by the initial number average molecular weight.

The hydrolysis degree may be represented by Equation 2 below:

$$\text{Hydrolysis degree (\%)} = \frac{\text{Initial number average molecular weight} - \text{Number average molecular weight after hydrolysis}}{\text{Initial number average molecular weight}} \times 100$$

[Equation 2]

Here, the biodegradable polyester resin composition according to an embodiment is immersed in 80° C. water, and then subjected to a hydrolysis acceleration test for a certain period. An initial number average molecular weight of the biodegradable polyester resin composition before performing the hydrolysis acceleration test and a number average molecular weight after hydrolysis of the biodegradable polyester resin composition subjected to the hydrolysis acceleration test for a certain period are measured by gel permeation chromatography (GPC).

The hydrolysis degree was derived by dividing a difference between the initial number average molecular weight and the number average molecular weight after hydrolysis for a certain period by an initial number average molecular weight.

In addition, when measuring the hydrolysis degree, the biodegradable polyester resin composition according to an embodiment is manufactured into a sheet having a thickness of about 300 μm. Next, the manufactured sheet is cut into a size of about 30 mm×30 mm to produce flakes. The flakes may be immersed in the hot water, and the hydrolysis acceleration test may be performed.

In the biodegradable polyester resin composition according to an embodiment, a hydrolysis degree after one week may range from about 40% to about 65%. In the biodegradable polyester resin composition according to an embodiment, the hydrolysis degree after one week may range from about 45% to about 63%.

In the biodegradable polyester resin composition according to an embodiment, a hydrolysis degree after two weeks may range from about 80% to about 93%. In the biodegradable polyester resin composition according to an embodiment, the hydrolysis degree after two weeks may range from about 85% to about 92%.

In the biodegradable polyester resin composition according to an embodiment, a hydrolysis degree after three weeks may range from about 90% to about 97%. In the biodegradable polyester resin composition according to an embodiment, a hydrolysis degree after three weeks may range from about 91% to about 96%.

In the biodegradable polyester resin composition according to an embodiment, a hydrolysis degree after four weeks may range from about 92% to about 99%. In the biodegradable polyester resin composition according to an embodiment, a hydrolysis degree after four weeks may range from about 93% to about 97%.

In the biodegradable polyester resin composition according to an embodiment, a hydrolysis degree after six weeks may range from about 94% or more. In the biodegradable polyester resin composition according to an embodiment, a hydrolysis degree after six weeks may range from about 95% or more.

In the biodegradable polyester resin composition according to an embodiment, a hydrolysis degree after nine weeks may range from about 95% or more. In the biodegradable polyester resin composition according to an embodiment, a hydrolysis degree after nine weeks may range from about 96% or more.

In the biodegradable polyester resin composition according to an embodiment, a hydrolysis degree increase rate from one week to two weeks may range from about 25%/week to about 50%/week. In the biodegradable polyester resin composition according to an embodiment, the hydrolysis degree increase rate from one week to two weeks may range from about 29%/week to about 50%/week. In the biodegradable polyester resin composition according to an embodiment, the hydrolysis degree increase rate from one week to two weeks may range from about 30%/week to about 45%/week.

Since the biodegradable resin composition according to an embodiment has a hydrolysis degree and hydrolysis degree increase rate within the specified range above, the biodegradable resin composition according to an embodiment has appropriate durability in daily life and may be hydrolyzed when discarded. That is, since the biodegradable resin composition according to an embodiment has a hydrolysis degree and hydrolysis degree increase rate in an appropriate range, it may have sufficient hydrolysis resistance when used for an appropriate period of time, such as in disposable packaging. In addition, the biodegradable resin composition according to an embodiment may be degraded by hydrolysis and biodegradation, not only when disposed of in the soil, but also when disposed of in the river or the sea.

In the biodegradable polyester resin composition according to an embodiment, a biodegradability per aliphatic carboxylic acid may range from about 1.5 or more. In addition, the biodegradability per aliphatic carboxylic acid may range from about 1.65 or more. The biodegradability per aliphatic carboxylic acid may range from about 1.75 or more. The biodegradability per aliphatic carboxylic acid may range from about 1.8 or more. The biodegradability per aliphatic carboxylic acid may range from about 1.85 or more. The biodegradability per aliphatic carboxylic acid may range from about 1.90 or more. A maximum value of the biodegradability per aliphatic carboxylic acid may range from about 4.

The biodegradability per aliphatic carboxylic acid is obtained by dividing the biodegradability after nine weeks by a ratio of the aliphatic carboxylic acid based on all dicarboxylic acids. The biodegradability per aliphatic carboxylic acid is obtained by dividing the biodegradability after nine weeks by a mol % ratio of the aliphatic carboxylic acid based on all dicarboxylic acids.

The biodegradability per aliphatic carboxylic acid may be represented by Equation 3 below:

$$\text{Biodegradability per aliphatic carboxylic acid} = \frac{\text{Biodegradability after 9 weeks}}{\text{Content (mol \%) of aliphatic carboxylic acid in all carboxylic acids}} \quad [\text{Equation 3}]$$

The biodegradability per the aliphatic carboxylic acid may be in the above range by appropriately controlling the number of the first blocks, the number of the second blocks, the composition of the biodegradable polyester resin such as the content of the aliphatic dicarboxylic acid or the content of the aromatic dicarboxylic acid, conditions of the process of preparing the biodegradable polyester resin, the reinforcing material, the metal salt, the anti-hydrolysis agent, the chain extender, the oligomer, the heat stabilizer, or the like.

In addition, the acid value of the biodegradable polyester resin composition according to an embodiment may range from about 0.01 mg KOH/g to about 3 mg KOH/g. The acid value of the biodegradable polyester resin composition according to an embodiment may range from about 0.1 mg KOH/g to about 2.5 mg KOH/g. The acid value of the biodegradable polyester resin composition according to an embodiment may range from about 0.1 mg KOH/g to about 2.3 mg KOH/g.

Since the biodegradable polyester resin composition according to an embodiment has an acid value within the specified range above, it may have hydrolysis and biodegradability characteristics as described above.

In addition, the biodegradable polyester resin composition according to an embodiment may include a nitrogen element. The nitrogen element may be derived from the metal salt and/or the chain extender. The content of the nitrogen element may range from about 0.1 ppm to about 500 ppm based on the biodegradable polyester resin composition according to an embodiment. The content of the nitrogen element may range from about 1 ppm to about 400 ppm based on the biodegradable polyester resin composition according to an embodiment. The content of the nitrogen element may range from about 1 ppm to about 300 ppm based on the biodegradable polyester resin composition according to an embodiment. The content of the nitrogen element may range from about 1 ppm to about 100 ppm based on the biodegradable polyester resin composition according to an embodiment.

In addition, the biodegradable polyester resin composition according to an embodiment may include a silicon element. The silicon element may be derived from the anti-hydrolysis agent and the like. The content of the silicon element may range from about 0.1 ppm to about 100 ppm based on the biodegradable polyester resin composition according to an embodiment. The content of the silicon element may range from about 0.5 ppm to about 90 ppm based on the biodegradable polyester resin composition according to an embodiment. The content of the silicon element may range from about 1 ppm to about 80 ppm based on the biodegradable polyester resin composition according to an embodiment. The content of the silicon element may range from about 1 ppm to about 50 ppm based on the biodegradable polyester resin composition according to an embodiment.

In addition, the biodegradable polyester resin composition according to an embodiment may include a metal element. The metal element may be derived from the metal salt. The content of the metal element may range from about 0.1 ppm to about 100 ppm based on the biodegradable polyester resin composition according to an embodiment. The content of the metal element may range from about 0.5 ppm to about 90 ppm based on the biodegradable polyester resin composition according to an embodiment. The content of the metal element may range from about 1 ppm to about 80 ppm based on the biodegradable polyester resin composition according to an embodiment. The content of the metal element may range from about 1 ppm to about 50 ppm based on the biodegradable polyester resin composition according to an embodiment.

In addition, the biodegradable polyester resin composition according to an embodiment may have surface tension, a water contact angle, a diiodomethane contact angle, surface free energy, dispersity and polarity.

The surface tension, the water contact angle, the diiodomethane contact angle, the surface free energy, the dispersity and the polarity may be measured from the surface of the polyester sheet.

In the biodegradable polyester resin composition according to an embodiment, the surface tension may range from about 30 dynes to about 55 dyne. In the biodegradable polyester resin composition according to an embodiment, the surface tension may range from about 35 dynes to about 50 dyne.

In the biodegradable polyester resin composition according to an embodiment, the water contact angle may range from about 60° to about 90°. In the biodegradable polyester resin composition according to an embodiment, the water contact angle may range from about 65° to about 85°. In the biodegradable polyester resin composition according to an embodiment, the water contact angle may range from about 67° to about 80°.

In the biodegradable polyester resin composition according to an embodiment, the diiodomethane contact angle may range from about 20° to about 40°. In the biodegradable polyester resin composition according to an embodiment, the diiodomethane contact angle may range from about 20° to about 35°.

In the biodegradable polyester resin composition according to an embodiment, the surface free energy may range from about 40 mN/m to about 60 mN/m. In the biodegradable polyester resin composition according to an embodiment, the surface free energy may range from about 42 mN/m to about 55 mN/m.

In the biodegradable polyester resin composition according to an embodiment, the dispersity may range from about 35 mN/m to about 55 mN/m. In the biodegradable polyester resin composition according to an embodiment, the dispersity may range from about 40 mN/m to about 50 mN/m.

In the biodegradable polyester resin composition according to an embodiment, the polarity may range from about 2 mN/m to about 8 mN/m. In the biodegradable polyester resin composition according to an embodiment, the polarity may range from about 3 mN/m to about 7 mN/m.

The surface tension, water contact angle, diiodomethane contact angle, surface free energy, dispersity and polarity of the biodegradable polyester resin composition according to an embodiment may be within the above ranges due to the composition of the biodegradable polyester resin, the oligomer, the reinforcing material, the chain extender, the metal salt, the anti-hydrolysis agent and the heat stabilizer and processes such as the esterification, the polycondensation reaction, the chain extension reaction and the heat treatment reaction. Accordingly, the biodegradable polyester resin composition according to an embodiment may have appropriate hydrolysis and appropriate biodegradability.

The above contents are described in more detail through the following examples. However, the following examples are only for illustrating the present disclosure, and the scope of the present disclosure is not limited thereto.

Preparation Example

Preparation of Pretreated Cellulose Nanocrystals (CNC)

Dry powder-type cellulose nanocrystals (NVC-100, Manufacturer: Celluforce) having a particle size of about 1 μm to about 50 μm were dispersed in water at 1% by weight, and then sonicated at an output of 20000 J/5 for 1 minute using a tip-type ultrasonic disperser, thereby producing pretreated nanocellulose.

Monomer Composition for Preparing Oligomer 1,4-butanediol (1,4-BDO), terephthalic acid (TPA) and adipic acid (AA) were uniformly mixed in a molar ratio of about 3:1:2. Here, the average particle diameter of the terephthalic acid (TPA) was about 150 μm.

Preparation of Oligomer 1,4-butanediol (1,4-BDO), terephthalic acid (TPA) and adipic acid (AA) were uniformly mixed in a molar ratio of about 3:1:2. Here, the average particle diameter of the terephthalic acid (TPA) was about 130 μm. Next, the mixture was esterified at about 220° C. under normal pressure for about 10 minutes, and the hydrolysis regulator was prepared.

Chain extender: Tri(4-isocyanatophenyl)methane

EXAMPLE

Example 1

Preparation of Biodegradable Polyester Resin

First Operation: Pretreating to Obtain Slurry

As shown in Table 1, pretreated nanocellulose, 1,4-butanediol (1,4-BDO) and terephthalic acid (TPA) were mixed in a molar ratio (1,4-BDO:TPA) of 1.2:1 and fed into a slurry tank (the bottom of the slurry tank was an anchor type, the height to an agitator was 40 mm, and three rotary blades were provided) in a non-catalytic state. Here, D50 of the terephthalic acid (TPA) was 130 μm, and the standard deviation (SD) of D50 of the terephthalic acid (TPA) was 30.

Next, the mixture was pretreated by stirring at 60° C. and 100 rpm for 1 hour, and a slurry was obtained without phase separation.

Second Operation: Obtaining Prepolymer

The slurry obtained in the first step was fed into a reactor through a supply line, and tetrabutyl titanate (Dupont, Tyzor® TnBT product) as a titanium-based catalyst was fed at 250 ppm thereinto, followed by performing a first esterification at 220° C. under normal pressure for about 2 hours until 95% of by-product water was discharged.

53 mol % of 1,4-butanediol (1,4-BDO) based on the total number of moles of diol components, 53 mol % of adipic acid (AA) based on the total number of moles of dicarboxylic acid, and 200 ppm of tetrabutyl titanate (Dupont, Tyzor® TnBT product) as a titanium-based catalyst based on the total weight of a diol, an aromatic dicarboxylic acid and an aliphatic dicarboxylic acid were added to the reaction product, and then second esterification was performed at 210° C. under normal pressure for about 2 hours 30 minutes until 95% of by-products was discharged. As a result, a second esterification product was produced.

Next, the monomer composition was added in a content ranging from about 1 part by weight based on 100 parts by weight of the esterification product to the second esterification product. A mixture of the monomer composition and the second esterification product was subjected to third esterification at about 220° C. for about 20 minutes. Next, a prepolymer having a number average molecular weight of about 1200 g/mol was prepared by the third esterification.

Third Operation: Polycondensing 400 ppm of tetrabutyl titanate (Dupont, Tyzor® TnBT product) as a titanium-based catalyst and 200 ppm of a triethylene phosphate stabilizer were added to the prepolymer and stabilized for about 10 minutes. Next, the temperature of the reaction mixture was elevated to 250° C., and then a polycondensation reaction was carried out at 0.5 Torr for 4 hours, thereby preparing a polymer having a number average molecular weight of 55000 g/mol.

Next, about 0.5 wt % of tri(4-isocyanatophenyl)methane, based on the amount of the polymer, was added to the polymer. Next, the polymer was subjected to a chain extension reaction at about 240° C. for about 10 minutes. Next, the polymer was cooled at 5° C., and then cut, thereby obtaining a biodegradable polyester resin pellet.

Example 2

As shown in Tables 1 and 2 below, the contents of adipic acid, terephthalic acid, cellulose nanocrystals, a monomer composition and a chain extender were varied. The polymer was cooled without a chain extension reaction, thereby obtaining a biodegradable polyester resin pellet. Next, the biodegradable polyester resin pellet was fed into a twin-screw extruder, melt-extruded at about 250° C. for about 2 minutes, and cooled at about 5° C., followed by cutting. As a result, a pellet was produced again. Except for the contents and the process, other processes were carried out in the substantially same manner as in Example 1.

Examples 3 to 6 and Comparative Examples 1 and 2

As shown in Tables 1 and 2, the contents of adipic acid, terephthalic acid, cellulose nanocrystals, a monomer composition and a chain extender were varied. Other processes, except for the contents and the process, were carried out in substantially the same manner as in Example 1 or 2.

Examples 7 to 13 and Comparative Example 3

The first esterification and the second esterification were carried out, but the third esterification was not carried out. In addition, the oligomer was added to the prepolymer in the polycondensation step to produce a polymer. As shown in the following Tables 3 and 4, the contents of adipic acid, terephthalic acid, cellulose nanocrystals, an oligomer and a chain extender and process conditions were varied. Other processes were carried out in substantially the same manner as in Example 1 or 2.

Manufacture of Biodegradable Polyester Sheet

After preparing two Teflon sheets, a stainless steel (SUS) mold having a size 12 cm×12 cm was placed on one Teflon sheet, and about 7 g of the prepared polyester resin pellet was put into the stainless steel (SUS) mold having a size 12 cm×12 cm. Next, the mold was covered with another Teflon™ sheet, and placed in the center of a hot press (manufacturer: Widlab, model name: WL 1600SA) having a surface size of about 25 cm×25 cm. The mold was maintained at about 210° C. under a pressure of about 10 Mpa for about 3 minutes, and then detached, followed by immediately cooling in water of 20° C. for about 30 seconds. Next, a biodegradable polyester sheet having an area of about 10 cm×10 cm and a thickness of about 300 μm was manufactured.

Manufacture of Biodegradable Polyester Film

After drying the biodegradable polyester resin pellet at 80° C. for 5 hours, melt extrusion was carried out at 160° C. using Blown Film Extrusion Line (Manufacturer: YOOJIN ENGINEERING), thereby manufacturing a biodegradable polyester film having a thickness of 50 μm.

TABLE 1

| Classification | 1,4-BDO (mol %) | TPA (mol %) | AA (mol %) | CNC (ppm) | Monomer composition (parts by weight) | Chain extender (wt %) | Chain extension reaction | Re-extrusion process |
|---|---|---|---|---|---|---|---|---|
| Example 1 | 120 | 47 | 53 | 700 | 1 | 0.5 | ○ | X |
| Example 2 | 120 | 50 | 50 | | 3 | | X | ○ |
| Example 3 | 120 | 53 | 47 | 700 | 2 | 0.5 | ○ | X |
| Example 4 | 120 | 45 | 55 | | 3 | 0.5 | ○ | X |
| Example 5 | 120 | 55 | 45 | 700 | 2 | 0.1 | ○ | X |
| Example 6 | 120 | 50 | 50 | 700 | 2 | | X | ○ |
| Comparative Example 1 | 120 | 60 | 40 | | | | | |
| Comparative Example 2 | 120 | 50 | 50 | | | 7 | ○ | ○ |

As shown in Table 2 below, the molar ratio of the monomer composition and the conditions of the third esterification were varied.

TABLE 2

| Classification | 1,4-BDO (molar ratio) | TPA (molar ratio) | AA (molar ratio) | Third esterification time (min) | Third esterification temperature (° C.) |
|---|---|---|---|---|---|
| Example 1 | 3 | 1 | 2 | 20 | 220 |
| Example 2 | 3.5 | 1.5 | 2 | 20 | 210 |
| Example 3 | 4 | 1 | 3 | 25 | 210 |
| Example 4 | 3 | 1 | 2 | 30 | 220 |
| Example 5 | 2 | 1 | 1 | 15 | 220 |
| Example 6 | 2.5 | 1 | 1.5 | 15 | 210 |
| Comparative Example 1 | | | | | |
| Comparative Example 2 | | | | | |

TABLE 3

| Classification | 1,4-BDO (mol %) | TPA (mol %) | AA (mol %) | CNC (ppm) | Oligomer (wt %) | Chain extender (wt %) | Chain extension reaction | Heat treatment process |
|---|---|---|---|---|---|---|---|---|
| Example 7 | 140 | 47 | 53 | | 5 | 0.5 | ○ | X |
| Example 8 | 140 | 51.5 | 48.5 | | | | X | ○ |
| Example 9 | 140 | 48 | 52 | 700 | 2 | 0.5 | ○ | X |
| Example 10 | 140 | 45 | 55 | | 2 | 0.5 | ○ | X |
| Example 11 | 140 | 50 | 50 | 700 | 3 | 0.1 | ○ | X |
| Example 12 | 140 | 50 | 50 | 700 | | | X | ○ |
| Comparative Example 3 | 120 | 51.5 | 48.5 | | | | | |

TABLE 4

| Classification | First esterification temperature (° C.) | First esterification time | Second esterification temperature (° C.) | Second esterification time | Pretreatment |
|---|---|---|---|---|---|
| Example 7 | 220 | 1.5 | 240 | 1.5 | ○ |
| Example 8 | 225 | 1.5 | 225 | 2.0 | ○ |
| Example 9 | 220 | 2.0 | 225 | 2.0 | ○ |
| Example 10 | 215 | 2.0 | 230 | 2.0 | ○ |
| Example 11 | 220 | 1.5 | 220 | 2.5 | ○ |
| Example 12 | 220 | 1.5 | 220 | 2.0 | ○ |
| Comparative Example 3 | 200 | 2.0 | 205 | 2.0 | X |

Evaluation Examples

Evaluation Example 1: An Average Particle Diameter (D50) and a Standard Deviation <Average Particle Diameter (D50) and Standard Deviation of Aromatic Dicarboxylic Acid>

With regard to a particle size distribution (PSD), the average particle diameter (D50) and standard deviation (SD) of an aromatic dicarboxylic acid (TPA or DMT) were obtained using a particle size analyzer Microtrac S3500 (Microtrac Inc) according to the following conditions:

Use Environment

Temperature: 10 to 35° C., humidity: 90% RH, non-condensing maximum

D50 and SD, which are average particle size distributions for each section, were measured.

The standard deviation means the square root of the variance and may be calculated using the software.

<Particle Diameter of Nanocellulose>

The particle size and average particle deviation of nanocellulose were measured using the principle of dynamic light scattering (DLS) at 25° C. and a measurement angle of 175° using Zetasizer Nano ZS (Manufacturer: Marven). Here, a peak value derived through the polydispersity index (PdI) in a confidence interval of 0.5 was measured as a particle diameter.

Evaluation Example 2: Hydrolysis Degree

The biodegradable polyester resins prepared in the examples and the comparative examples were immersed in 80° C. water (100% RH), and then an accelerated hydrolysis test was carried out.

Specifically, 5 g of each of the polyester resins of the examples and the comparative examples was added to 500 mL of deionized water (DI Water), and then blocked with a stopper to prevent water from evaporating and subjected to an accelerated hydrolysis test in an 80° C. convection (hot air) oven. The humidity environment of the biodegradable polyester sheet is the same as that at 100% RH because it is created by immersion in water.

The number average molecular weights of the polyester resins of the examples and the comparative examples after a certain period were measured using gel permeation chromatography (GPC). A hydrolysis degree was derived by dividing a difference between the initial number average molecular weight and the number average molecular weight after a certain period by the initial number average molecular weight.

Evaluation Example 3: Biodegradability

Each of the biodegradable polyester resins prepared in the examples and the comparative examples was mixed with the following compost, and was subjected to a biodegradation acceleration test at 60° C. and a relative humidity of 90%.

The number average molecular weight of each of the polyester resins of the examples and the comparative examples was measured using gel permeation chromatography (GPC) after a certain period. Biodegradability was derived by dividing the difference between the initial number average molecular weight and the number average molecular weight after a certain period by the initial number average molecular weight.

Compost

Manufacturer: Taeheung F&G

Product Name: Jisaengto (by-product fertilizer grade 1 compost)

Compost components: 40 wt % of pig manure, 15 wt % of chicken manure, 37 wt % of sawdust, 5 wt % of zeolite, a microbial agent 3 wt %

Evaluation Example 4: Oligomer Content

The biodegradable polyester pellet manufactured in each of the examples and the comparative examples was pulverized to obtain a biodegradable polyester powder having an average particle diameter (D50) of about 50 μm. The biodegradable polyester powder was immersed in acetonitrile for about 24 hours. Next, a supernatant was sampled, and the molecular weights and contents of the components extracted by LC mass were measured using dibutyl phthalate as a standard.

HR-LC-MS equipment: Model name (Orbitrap HR LC-MS, Q-Exactive, manufactured by Thermo Fisher)

Column: C18

LC detector: 254 nm

Eluent: 5% ACN (with 0.1% Formic acid)/95% $H_2O$→100% ACN (with 0.1% Formic acid)

Ionization mode: ESI mode

Mass: Positive 50-750, 500-3000

Evaluation Example 5: Water contact angle and polarity

The water contact angle and polarity of the surface of each of the biodegradable polyester sheet manufactured in the examples and the comparative examples were measured under the following conditions:

Surface tension: Wet tension test mixtures Nos. 40 to 64

Manufacturer: Wako

Components: ethylene glycol, monoethyl ether

Surface energy meter: MSA One-Click SFE (product name)/KRUSS (manufacturer)

Biodegradability was measured as shown in Tables 5 and 6 below.

TABLE 5

| Classification | Molecular weight reduction rate after one week (%) | Molecular weight reduction rate after two weeks (%) | Molecular weight reduction rate after three weeks (%) | Molecular weight reduction rate after four weeks (%) | Molecular weight reduction rate after six weeks (%) | Molecular weight reduction rate after nine weeks (%) |
|---|---|---|---|---|---|---|
| Example 1 | 52 | 62 | 71 | 78 | 87 | 90 |
| Example 2 | 53 | 64 | 71 | 78 | 88 | 90 |
| Example 3 | 57 | 64 | 71 | 78 | 88 | 91 |
| Example 4 | 51 | 63 | 70 | 78 | 87 | 90 |
| Example 5 | 56 | 65 | 72 | 77 | 86 | 90 |
| Example 6 | 58 | 65 | 73 | 78 | 87 | 90 |
| Comparative Example 1 | 38 | 59 | 66 | 73 | 80 | 82 |
| Comparative Example 3 | 48 | 61 | 65 | 72 | 77 | 79 |

TABLE 6

| Classification | Molecular weight reduction rate after one week (%) | Molecular weight reduction rate after two weeks (%) | Molecular weight reduction rate after three weeks (%) | Molecular weight reduction rate after four weeks (%) | Molecular weight reduction rate after six weeks (%) | Molecular weight reduction rate after nine weeks (%) |
|---|---|---|---|---|---|---|
| Example 7 | 55 | 65 | 72 | 78 | 87 | 90 |
| Example 8 | 61 | 66 | 71 | 78 | 88 | 90 |
| Example 9 | 54 | 64 | 71 | 78 | 88 | 90 |
| Example 10 | 57 | 67 | 71 | 78 | 87 | 90 |
| Example 11 | 56 | 66 | 71 | 78 | 87 | 90 |
| Example 12 | 59 | 66 | 71 | 78 | 87 | 90 |
| Comparative Example 3 | 74 | 79 | 84 | 86 | 91 | 92 |

As shown in Tables 7 and 8 below, hydrolysis degrees were measured.

TABLE 7

| Classification | Molecular weight reduction rate after one week (%) | Molecular weight reduction rate after two weeks (%) | Molecular weight reduction rate after three weeks (%) | Molecular weight reduction rate after four weeks (%) | Molecular weight reduction rate after six weeks (%) | Molecular weight reduction rate after nine weeks (%) |
|---|---|---|---|---|---|---|
| Example 1 | 52 | 87 | 94 | 95 | 97 | 97 |
| Example 2 | 52 | 89 | 95 | 96 | 97 | 97 |
| Example 3 | 58 | 91 | 95 | 96 | 97 | 97 |
| Example 4 | 47 | 87 | 94 | 95 | 96 | 97 |
| Example 5 | 55 | 88 | 95 | 96 | 97 | 97 |
| Example 6 | 57 | 89 | 95 | 96 | 97 | 97 |
| Comparative Example 1 | 31 | 89 | 93 | 95 | 96 | 96 |
| Comparative Example 2 | 45 | 88 | 93 | 95 | 96 | 96 |

TABLE 8

| Classification | Molecular weight reduction rate after one week (%) | Molecular weight reduction rate after two weeks (%) | Molecular weight reduction rate after three weeks (%) | Molecular weight reduction rate after four weeks (%) | Molecular weight reduction rate after six weeks (%) | Molecular weight reduction rate after nine weeks (%) |
|---|---|---|---|---|---|---|
| Example 7 | 55 | 89 | 95 | 96 | 97 | 97 |
| Example 8 | 47 | 86 | 94 | 96 | 97 | 97 |
| Example 9 | 49 | 88 | 95 | 96 | 97 | 97 |
| Example 10 | 58 | 89 | 95 | 96 | 97 | 97 |
| Example 11 | 55 | 88 | 95 | 96 | 97 | 97 |

TABLE 8-continued

| Classification | Molecular weight reduction rate after one week (%) | Molecular weight reduction rate after two weeks (%) | Molecular weight reduction rate after three weeks (%) | Molecular weight reduction rate after four weeks (%) | Molecular weight reduction rate after six weeks (%) | Molecular weight reduction rate after nine weeks (%) |
|---|---|---|---|---|---|---|
| Example 12 | 54 | 89 | 94 | 96 | 97 | 97 |
| high Comparative Example 3 | 81 | 94 | 96 | 97 | 97 | 97 |

As shown in Tables 9 and 10 below, the contents of the first oligomer, the second oligomer, the third oligomer and the fourth oligomer were measured.

TABLE 9

| Classification | First oligomer (ppm) | Second oligomer (ppm) | Third oligomer (ppm) | Fourth oligomer (ppm) | Total oligomers (ppm) |
|---|---|---|---|---|---|
| Example 1 | 3681 | 2835 | 1222 | 1535 | 10238 |
| Example 2 | 4133 | 3216 | 1559 | 1890 | 11654 |
| Example 3 | 3293 | 2853 | 979 | 1256 | 9835 |
| Example 4 | 4163 | 2959 | 1421 | 1785 | 12035 |
| Example 5 | 3249 | 2546 | 1623 | 1678 | 11021 |
| Example 6 | 3523 | 2842 | 1489 | 1553 | 10456 |
| Comparative Example 1 | 1650 | 752 | 652 | 653 | 4250 |
| Comparative Example 2 | 1582 | 523 | 541 | 601 | 3965 |

TABLE 10

| Classification | First oligomer (ppm) | Second oligomer (ppm) | Third oligomer (ppm) | Fourth oligomer (ppm) | Total oligomers (ppm) |
|---|---|---|---|---|---|
| Example 1 | 4163 | 2959 | 1451 | 1768 | 11354 |
| Example 2 | 1582 | 523 | 546 | 606 | 3645 |
| Example 3 | 3293 | 2853 | 979 | 1256 | 9351 |
| Example 4 | 3249 | 2546 | 1623 | 1679 | 10214 |
| Example 5 | 3856 | 2756 | 1538 | 1589 | 10900 |
| Example 6 | 1625 | 678 | 635 | 758 | 4205 |
| Comparative example | 3150 | 2765 | 895 | 1534 | 9856 |

First oligomer molecular weight: 421.18
Second oligomer molecular weight: 623.3
Third oligomer molecular weight: 643.3
Fourth oligomer molecular weight: 843.4

As shown in Tables 11 and 12 below, the surface properties of the biodegradable polyester sheets according to the examples and the comparative examples were measured.

TABLE 11

| Classification | Surface tension (dyne) | Water contact angle (°) | Diiodomethane contact angle (°) | Surface free energy (mN/m) | Dispersity (mN/m) | Polarity (mN/m) |
|---|---|---|---|---|---|---|
| Example 1 | 42 | 73.71 | 33.2 | 47.6 | 42.7 | 4.7 |
| Example 2 | 42 | 71.15 | 25.44 | 51.33 | 45.99 | 5.4 |
| Example 3 | 41 | 72.16 | 26.66 | 50.3 | 44.6 | 5.4 |
| Example 4 | 42 | 73.46 | 27.3 | 51.2 | 43.5 | 5.6 |
| Example 5 | 41 | 70.59 | 24.33 | 51.1 | 44.6 | 5.3 |
| Example 6 | 40 | 74.15 | 30.8 | 49.5 | 42.1 | 5.4 |
| Comparative Example 1 | 39 | 67.5 | 25.5 | 45.3 | 40.3 | 4.31 |
| Comparative Example 2 | 41 | 69.5 | 24.3 | 45.3 | 40.5 | 4.18 |

TABLE 12

| Classification | Surface tension (dyne) | Water contact angle (°) | Diiodomethane contact angle (°) | Surface free energy (mN/m) | Dispersity (mN/m) | Polarity (mN/m) |
|---|---|---|---|---|---|---|
| Example 1 | 42 | 73.7 | 33.2 | 47.6 | 42.7 | 4.7 |
| Example 2 | 42 | 71.5 | 25.4 | 51.33 | 45.99 | 5.4 |
| Example 3 | 41 | 72.6 | 26.6 | 50.3 | 44.6 | 5.4 |
| Example 4 | 42 | 73.4 | 27.3 | 51.2 | 43.5 | 5.6 |
| Example 5 | 41 | 70.5 | 24.3 | 51.1 | 44.6 | 5.3 |
| Example 6 | 40 | 74.1 | 30.8 | 49.5 | 42.1 | 5.4 |
| Comparative Example 1 | 39 | 77.5 | 27.5 | 49.3 | 43.3 | 5.31 |
| Comparative Example 2 | 41 | 75.5 | 29.3 | 51.3 | 43.5 | 5.18 |

As shown in Tables 5 to 12, the biodegradable resin compositions according to the examples may have appropriate hydrolysis, appropriate biodegradability and appropriate surface properties.

A biodegradable polyester resin composition according to an embodiment includes a hydrophilic regulator having a molecular weight of about 400 to about 1300. In addition, the hydrophilic regulator can adjust the hydrophilicity and/or hydrophobicity of the biodegradable polyester resin composition according to an embodiment. Accordingly, the hydrophilic regulator can control the hydrolysis degree of the biodegradable polyester resin composition according to an embodiment.

Due to the hydrophilic regulator, a preparation process, or the like, the biodegradable polyester resin composition according to an embodiment can have appropriate hydrolysis and appropriate biodegradability.

In particular, the biodegradable polyester resin composition according to an embodiment has a low initial hydrolysis degree and a high later hydrolysis degree. In addition, the biodegradable polyester resin composition according to an embodiment can have appropriate biodegradability per hydrolysis.

Accordingly, the biodegradable polyester resin composition according to an embodiment can be efficiently applied to a film for packaging and the like. That is, a film made of the biodegradable polyester resin composition according to an embodiment can be used for general purposes such as packaging. Here, since the biodegradable polyester resin composition according to an embodiment has a low initial hydrolysis degree, the biodegradable polyester film can maintain mechanical and chemical properties to a certain extent or more within a period of normal use by a user.

In addition, since the biodegradable polyester resin composition according to an embodiment has a high later hydrolysis degree, a film made of the biodegradable polyester resin composition according to an embodiment can be degraded when discarded after use. In particular, since the biodegradable polyester resin composition according to an embodiment has a high later hydrolysis, decomposition by ambient moisture and decomposition by microorganisms in the biodegradable polyester resin composition according to an embodiment can be complemented each other. Accordingly, the biodegradable polyester resin composition according to an embodiment can have a high biodegradability degree while having a low initial hydrolysis degree.

In addition, the biodegradable polyester resin composition according to an embodiment can have a biodegradability per aliphatic carboxylic acid of 1.5 or more. That is, the biodegradable polyester resin composition according to an embodiment has a high biodegradability degree while having a low aliphatic carboxylic acid content.

Accordingly, since the biodegradable polyester resin composition according to an embodiment includes aromatic carboxylic acid in a relatively high content, it can have a high biodegradability degree in a later period while having a high hydrolysis resistance degree in an initial period.

The biodegradable polyester resin composition according to an embodiment can maintain mechanical and chemical properties above a certain level during the period of use by a user. At the same time, since the biodegradable polyester resin composition according to an embodiment has a high later hydrolysis degree, it can be degraded in rivers or sea. That is, the biodegradable polyester resin composition according to an embodiment can solve environmental problems such as marine plastic problems.

Although the preferred embodiments of the present disclosure have been disclosed for illustrative purposes, those skilled in the art will appreciate that various modifications, additions and substitutions are possible, without departing from the scope and spirit of the disclosure as disclosed in the accompanying claims.

DESCRIPTION OF SYMBOLS slurry stirrer 100
esterification part 200
polycondensation reaction part 300
post-treatment part 400
first recovery part 510
second recovery part 520

What is claimed is:

1. A biodegradable polyester resin composition, comprising: a polyester resin comprising a diol, an aromatic dicarboxylic acid and an aliphatic dicarboxylic acid; and
a hydrophilic regulator,
wherein a content of the hydrophilic regulator ranges from 5000 ppm to 20000 ppm based on a total amount of the biodegradable polyester resin composition, and
wherein the hydrophilic regulator has a molecular weight of 400 to 1300,
wherein the hydrophilic regulator comprises:
a first oligomer having a molecular weight ranging from 415 to 425;
a second oligomer having a molecular weight ranging from 620 to 630;
a third oligomer having a molecular weight ranging from 640 to 650; and
a fourth oligomer having a molecular weight ranging from 840 to 850.

2. The biodegradable polyester resin composition according to claim 1, wherein the hydrophilic regulator comprises an oligomer formed by reaction of at least two of the diol, the aromatic dicarboxylic acid and the aliphatic dicarboxylic acid.

3. The biodegradable polyester resin composition according to claim 1, wherein a hydrolysis degree after one week is 35% to 60%, and
a hydrolysis degree after three weeks is 85% or more,
wherein the hydrolysis degree after one week and the hydrolysis degree after three weeks are measured by a measurement method below:
wherein in the measurement method,
the hydrolysis degree after one week is a number average molecular weight reduction rate, compared to an initial number average molecular weight of the biodegradable polyester film, of the biodegradable polyester film placed for one week under high-temperature and high-humidity conditions of 80° C. and a relative humidity of 100%, and
the hydrolysis degree after three weeks is a number average molecular weight reduction rate, compared to an initial number average molecular weight of the biodegradable polyester film, of the biodegradable polyester film placed for three weeks under high-temperature and high-humidity conditions of 80° C. and a relative humidity of 100%.

4. The biodegradable polyester resin composition according to claim 1 wherein a content of the first oligomer ranges from 3000 to 5000 ppm based on the polyester resin,
a content of the second oligomer ranging from 2000 ppm to 4000 ppm based on the biodegradable polyester resin, a content of the third oligomer ranging from 500 ppm to 2000 ppm based on the biodegradable polyester resin, and a content of the fourth oligomer ranging from 700 ppm to 2500p ppm based on the biodegradable polyester resin.

5. The biodegradable polyester resin composition according to claim 1, wherein the hydrophilic regulator comprises a first oligomer, wherein the first oligomer comprises one first unit represented by Formula 6 below and one second unit represented by Formula 7 below:

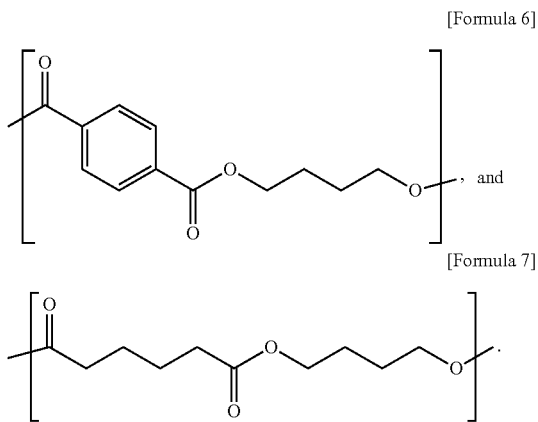

6. The biodegradable polyester resin composition according to claim 5 wherein the hydrophilic regulator comprises a second oligomer; and a third oligomer, wherein the second oligomer comprises one first unit denoted above and two second units denoted above, the third oligomer comprises two first units denoted above and one second unit denoted above, and the second oligomer is comprised in the hydrophilic regulator in a higher content than the third oligomer.

7. The biodegradable polyester resin composition according to claim 6 wherein the hydrophilic regulator further comprises a fourth oligomer, wherein the fourth oligomer comprises two first units denoted above and two second units denoted above.

8. The biodegradable polyester resin composition according to claim 1, wherein a water contact angle of the biodegradable polyester resin composition measured by a measurement method below is 65° to 90°, and a polarity of the biodegradable polyester resin composition measured by a measurement method below is 4 mN/m to 7 mN/m:

wherein in the measurement method
the biodegradable polyester resin composition is dried at 80° C., placed in a stainless steel mold, and compressed at 210° C. under a pressure of 10 MPa for 3 minutes to produce a polyester sheet having a thickness of 300 μm, and the water contact angle and the polarity are measured on a surface of the polyester sheet.

9. The biodegradable polyester resin composition according to claim 1, wherein a biodegradability of the biodegradable polyester resin composition after one week is 45% to 65%, a biodegradability of the biodegradable polyester resin composition after nine weeks is 85% or more, wherein the biodegradability after one week and the biodegradability after nine weeks are measured by a measurement method below:

wherein in the measurement method
the biodegradability after one week is a molecular weight reduction rate, compared to an initial molecular weight of the biodegradable polyester resin composition, of the biodegradable polyester resin composition placed at 60° C. and a relative humidity of 90% for one week under composting conditions, and the biodegradability after nine weeks is a molecular weight reduction rate, compared to an initial molecular weight of the biodegradable polyester resin composition, of the biodegradable polyester resin composition placed at 60° C. and a relative humidity of 90% for nine weeks under composting conditions.

10. A biodegradable polyester resin composition, comprising a polyester resin comprising a diol, an aromatic dicarboxylic acid and an aliphatic dicarboxylic acid, a hydrolysis degree after one week is 35% to 60%, and
a hydrolysis degree after three weeks is 85% or more,
wherein the hydrolysis degree after one week and the hydrolysis degree after three weeks are measured by a measurement method below:

wherein in the measurement method
the hydrolysis degree after one week is a number average molecular weight reduction rate, compared to an initial number average molecular weight of the biodegradable polyester resin composition, of the biodegradable polyester resin composition placed for one week under high-temperature and high-humidity conditions of 80° C. and a relative humidity of 100%, and the hydrolysis degree after three weeks is a number average molecular weight reduction rate, compared to an initial number average molecular weight of the biodegradable polyester resin composition, of the biodegradable polyester resin composition placed for three weeks under high-temperature and high-humidity conditions of 80° C. and a relative humidity of 100%.

11. The biodegradable polyester resin composition according to claim 10, wherein a biodegradability after nine weeks is 85% or more, wherein the biodegradability after nine weeks is a molecular weight reduction rate, compared to an initial molecular weight of the biodegradable polyester resin composition, of the biodegradable polyester resin composition placed at 60° C. and a relative humidity of 90% for nine weeks under composting conditions.

12. The biodegradable polyester resin composition according to claim 10, wherein a biodegradability after one week is 45% to 75%, wherein the biodegradability after one week is a molecular weight reduction rate, compared to an initial molecular weight of the biodegradable polyester resin composition, of the biodegradable polyester resin composition placed at 60° C. and a relative humidity of 90% for one week under composting conditions.

13. The biodegradable polyester resin composition according to claim 10, wherein a hydrolysis degree after two weeks is 80% to 95%, wherein the hydrolysis degree after two weeks is a number average molecular weight reduction rate, compared to an initial number average molecular weight of the biodegradable polyester resin composition, of the biodegradable polyester resin composition placed for two weeks under high-temperature and high-humidity conditions of 80° C. and a relative humidity of 100%.

14. The biodegradable polyester resin composition according to claim 13, wherein a hydrolysis degree after four weeks is 85% or more, wherein the hydrolysis degree after four weeks is a number average molecular weight reduction rate, compared to an initial number average molecular weight of the biodegradable polyester resin composition, of the biodegradable polyester resin composition placed for four weeks under high-temperature and high-humidity conditions of 80° C. and a relative humidity of 100%, and a hydrolysis degree increase rate from one week to two weeks is 29%/week to 50%/week, and a hydrolysis degree increase rate from three weeks to four weeks is 0.01%/week to 3%/week.

15. The biodegradable polyester resin composition according to claim 12, wherein a biodegradability after four weeks is 73% to 85%, wherein the biodegradability after four weeks is a number average molecular weight reduction rate, compared to an initial number average molecular weight of the biodegradable polyester resin composition, of the biodegradable polyester resin composition placed for four weeks under high-temperature and high-humidity conditions of 80° C. and a relative humidity of 100%, and a biodegradability increase rate from one week to four weeks is 3.5%/week to 8%/week.

16. The biodegradable polyester resin composition according to claim 10, wherein an acid value of the biodegradable polyester resin composition is 2.0 mg KOH/g or less.

17. The biodegradable polyester resin composition according to claim 16, wherein an oligomer having a molecular weight ranging from 400 to 1300 is comprised in an amount ranging from 5000 ppm to 20000 ppm based on a total amount of the biodegradable polyester resin composition.

18. The biodegradable polyester resin composition according to claim 17, wherein the oligomer comprises the diol, the aromatic dicarboxylic acid and the aliphatic dicarboxylic acid.

19. A biodegradable molded article, comprising a biodegradable resin composition, wherein the biodegradable resin composition comprises a polyester resin comprising a diol, an aromatic dicarboxylic acid and an aliphatic dicarboxylic acid; and a hydrophilic regulator, wherein a content of the hydrophilic regular ranges from 5000 ppm to 20000 ppm based on a total amount of the biodegradable polyester resin composition, and wherein the hydrophilic regulator has a molecular weight of 400 to 1300 wherein the hydrophilic regulator comprises:

a first oligomer having a molecular weight ranging from 415 to 425;

a second oligomer having a molecular weight ranging from 620 to 630;

a third oligomer having a molecular weight ranging from 640 to 650; and a fourth oligomer having a molecular weight ranging from 840 to 850.

* * * * *